US008780102B2

(12) United States Patent
Han

(10) Patent No.: US 8,780,102 B2
(45) Date of Patent: Jul. 15, 2014

(54) PIXEL, DISPLAY DEVICE, AND DRIVING METHOD THEREOF

(75) Inventor: Sam-Il Han, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 742 days.

(21) Appl. No.: 12/882,105

(22) Filed: Sep. 14, 2010

(65) Prior Publication Data

US 2011/0193855 A1 Aug. 11, 2011

(30) Foreign Application Priority Data

Feb. 5, 2010 (KR) ........................ 10-2010-0011060

(51) Int. Cl.
*G06F 3/038* (2013.01)
*G09G 5/00* (2006.01)
*G09G 5/10* (2006.01)

(52) U.S. Cl.
USPC ........................................... 345/208; 345/690

(58) Field of Classification Search
CPC ......... G09G 3/22; G09G 3/3208; G09G 3/30; G09G 3/3225; G09G 3/3233; G09G 3/3241; G09G 3/3266; G09G 3/3275; G09G 3/3258
USPC ................................. 345/204–215, 690–699
See application file for complete search history.

(56) References Cited

U.S. PATENT DOCUMENTS

2006/0248421 A1* 11/2006 Choi ............................ 714/731
2008/0030435 A1* 2/2008 Kim ............................... 345/76
2008/0079676 A1* 4/2008 Pak et al. ........................ 345/87
2008/0309653 A1* 12/2008 Takahashi et al. ............ 345/211
2009/0167648 A1* 7/2009 Jeon et al. ....................... 345/76
2009/0267936 A1* 10/2009 Kwon .......................... 345/213
2011/0141091 A1* 6/2011 Eom ............................ 345/211

FOREIGN PATENT DOCUMENTS

JP 2008-083272 4/2008
KR 10-2009-0047359 A 5/2009

* cited by examiner

*Primary Examiner* — Kent Chang
*Assistant Examiner* — William Lu
(74) *Attorney, Agent, or Firm* — Christie, Parker & Hale, LLP

(57) ABSTRACT

A pixel, a display device including the pixel, and a driving method are disclosed. Each of a plurality of pixels included in the display device includes: an organic light emitting diode (OLED); a driving transistor for transmitting a driving current to the OLED according to a data signal; a first transistor for transmitting the data signal to the driving transistor according to a scan signal; and a first capacitor including a first terminal coupled to the first transistor and a second terminal coupled to a gate electrode of the driving transistor. In addition, the driving transistor is for diode-connecting in response to a threshold voltage compensation signal during a threshold voltage compensation period to compensate for a threshold voltage of the driving transistor. The threshold voltage compensation signal includes at least two pulses.

34 Claims, 12 Drawing Sheets

PIXEL, DISPLAY DEVICE, AND DRIVING METHOD THEREOF

CROSS-REFERENCE TO RELATED APPLICATION

This application claims priority to and the benefit of Korean Patent Application No. 10-2010-0011060, filed in the Korean Intellectual Property Office on Feb. 5, 2010, the entire content of which is incorporated herein by reference.

BACKGROUND

1. Field

Aspects of embodiments according to the present invention relate to a pixel, a display device using the same, and a driving method thereof.

2. Description of the Related Art

Various kinds of flat panel display devices that are capable of reducing detriments of cathode ray tube (CRT) devices, such as their heavy weight and large size, have been developed in recent years. Such flat panel display devices include liquid crystal displays (LCDs), field emission displays (FEDs), plasma display panels (PDPs), and organic light emitting diode (OLED) displays.

Among these flat panel displays, the OLED display, which uses OLEDs to generate light by a recombination of electrons and holes for the display of images, has a fast response speed, low power consumption, excellent luminous efficiency, luminance, and viewing angle.

Generally, the OLED display is classified as a passive matrix OLED (PMOLED) or an active matrix OLED (AMOLED) according to a driving method of the OLED. Of these, the active matrix OLED, in which unit pixels are selectively lit in terms of resolution, contrast, and operation speed, is primarily used.

A typical pixel of the active matrix OLED includes the OLED, a driving transistor for controlling a current amount supplied to the OLED, and a switching transistor for transmitting a data signal controlling a light emitting amount of the OLED to the driving transistor.

However, the driving transistor of the pixel of the active matrix OLED may generate a difference of current flowing to the OLED due to a variation of its threshold voltage or a variation of a power source voltage transmitted to each pixel. This, in turn, can cause luminance variation of the OLEDs from one pixel to another.

In particular, in order to realize high image quality of the display device, high frequency driving may be applied while applying driving timing to the driving circuit of the pixel. In this case, however, it may be difficult to ensure that the time that the threshold voltage of the driving transistor of the pixel is applied is sufficiently compensated, such that the image quality may be deteriorated.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide for a driving circuit, a pixel using the driving circuit, a display device including the same, and a driving method thereof that are capable of realizing high image quality by providing sufficient time to compensate threshold voltages of driving transistors when driving each pixel of the display device by the high resolution and high frequency driving method. The technical features of the present invention are not limited to the above, and other non-mentioned features will be clearly understood by a person of ordinary skill in the art by way of the following description.

According to an exemplary embodiment of the present invention, a display device is provided. The display device includes a display unit, a scan driver, a data driver, and a light emission control driver. The display unit includes a plurality of scan lines, a plurality of threshold voltage compensation lines, a plurality of data lines, and a plurality of pixels. The scan lines are for transmitting a plurality of scan signals. The threshold voltage compensation lines are for transmitting a plurality of threshold voltage compensation signals. The data lines are for transmitting a plurality of data signals. The pixels are coupled to a plurality of light emission control lines for transmitting a plurality of light emission control signals. The scan driver is for transmitting the scan signals and the threshold voltage compensation signals. The data driver is for transmitting the data signals. The light emission control driver is for transmitting the plurality of light emission control signals. Each of the pixels includes an organic light emitting diode (OLED), a driving transistor, a first transistor, and a first capacitor. The driving transistor is for transmitting a driving current to the OLED according to one of the data signals. The first transistor is for transmitting the one of the data signals to the driving transistor according to one of the scan signals. The first capacitor includes a first terminal coupled to the first transistor and a second terminal coupled to a gate electrode of the driving transistor. The driving transistor is further for diode-connecting according to one of the threshold voltage compensation signals during a threshold voltage compensation period to compensate for a threshold voltage of the driving transistor. The one of the threshold voltage compensation signals includes at least two pulses.

The pixel may further include a first switch for diode-connecting the driving transistor according to the one of the plurality of threshold voltage compensation signals.

The gate electrode of the driving transistor may be for receiving an initialization voltage during an initialization period for initializing a gate electrode voltage of the driving transistor. The initialization period is before the threshold voltage compensation period.

The pixel may further include a first switch, a second switch, and a third switch. The first switch is for diode-connecting the driving transistor according to the one of the plurality of threshold voltage compensation signals. The second switch is for transmitting the initialization voltage to the gate electrode of the driving transistor during the initialization period. The third switch is for transmitting an assistance voltage to the first terminal of the first capacitor according to the one of the threshold voltage compensation signals.

The pixel may further include a first switch for diode-connecting the driving transistor according to the one of the plurality of threshold voltage compensation signals. The one of the scan signals may be the one of the threshold voltage compensation signals. The OLED may be for emitting light according to the one of the data signals when a final pulse of the at least two pulses is transmitted.

The pixels may be arranged in a plurality of pixel rows. The pixel may further include a second switch and a third switch. The second switch is for transmitting an initialization voltage to the gate electrode of the driving transistor during an initialization period for initializing a gate electrode voltage of the driving transistor. The third switch is for transmitting an assistance voltage to the first terminal of the first capacitor according to one of the light emission control signals of a next one of the plurality of pixel rows during the initialization period.

The scan driver may be further for receiving a start signal, a first clock signal, a second clock signal, a first initialization signal, and a second initialization signal, and for sequentially shifting the start signal by a first period to generate the threshold voltage compensation signals. The start signal includes the at least two pulses. The second clock signal has a phase difference of a half cycle from the first clock signal. The first initialization signal is generated concurrently with the second clock signal. The second initialization signal is generated concurrently with the first clock signal.

The scan driver may include a plurality of first sequential drivers and a plurality of second sequential drivers. The first sequential drivers are for receiving a first input signal including the at least two pulses concurrently with the first clock signal, and outputting one of the second clock signal or a first power source voltage according to the first input signal and the first initialization signal as first threshold voltage compensation signals of the threshold voltage compensation signals. The second sequential drivers are for receiving a second input signal comprising the at least two pulses concurrently with the second clock signal, and outputting one of the first clock signal or the first power source voltage according to the second input signal and the second initialization signal as second threshold voltage compensation signals of the threshold voltage compensation signals.

Each first sequential driver of the plurality of first sequential drivers may be for receiving the start signal or one of the second threshold voltage compensation signals of one of the second sequential drivers that is earlier than and adjacent to the first sequential driver as the first input signal.

The first sequential driver may include a fourth switch and a fifth switch. The fourth switch is for transmitting the first power source voltage to one of the threshold voltage compensation lines and another of the second sequential drivers that is adjacent to and later than the first sequential driver in response to the first initialization signal. The fifth switch is for transmitting the second clock signal to the one of the threshold voltage compensation lines and the other of the second sequential drivers in response to the first input signal.

The first sequential driver may further include a sixth switch and a seventh switch. The sixth switch is for transmitting the first input signal to the fifth switch according to the first clock signal. The seventh switch is for transmitting the first power source voltage to the fourth switch according to the first input signal. The seventh switch may be further for turning on when the first input signal is a first level. The fourth switch may be further for turning off according to the first power source voltage.

The first sequential driver may further include an eighth switch for transmitting a second power source voltage to the fourth switch according to the first initialization signal. The fourth switch may be further for turning on according to the second power source voltage.

The first sequential driver may further include a ninth switch for transmitting the first power source voltage to a drain electrode of the sixth switch according to the second power source voltage.

The ninth switch may include at least two transistors that are coupled in series. The at least two transistors are for turning on according to the second power source voltage.

The first sequential driver may further include a first capacitor and a second capacitor. The first capacitor includes one terminal coupled to a first node for transmitting a voltage for controlling a switching operation of the fourth switch and another terminal coupled to the first power source. The second capacitor includes one terminal coupled to a second node for transmitting a voltage for controlling a switching operation of the fifth switch and another terminal coupled to an output terminal of the first sequential driver.

The fourth switch may include a first electrode coupled to the first power source and a second electrode coupled to the output terminal. The fifth switch may include a first electrode coupled to the output terminal and a second electrode for receiving the second clock signal.

Each second sequential driver of the plurality of second sequential drivers may be for receiving one of the first threshold voltage compensation signals of one of the first sequential drivers that is earlier than and adjacent to the second sequential driver as the second input signal.

The second sequential driver may further include a tenth switch and an eleventh switch. The tenth switch is for transmitting the first power source voltage to one of the threshold voltage compensation lines and another of the first sequential drivers that is adjacent to and later than the second sequential driver in response to the second initialization signal. The eleventh switch is for transmitting the first clock signal to the one of the threshold voltage compensation lines and the other of the first sequential drivers in response to the second input signal.

The second sequential driver may further include a twelfth switch and a thirteenth switch. The twelfth switch is for transmitting the second input signal to the eleventh switch according to the second clock signal. The thirteenth switch is for transmitting the first power source voltage to the tenth switch according to the second input signal. The thirteenth switch may be further for turning on when the second input signal is a first level. The tenth switch may be further for turning off according to the first power source voltage.

The second sequential driver may further include a fourteenth switch for transmitting a second power source voltage to the tenth switch according to the second initialization signal. The tenth switch may be further for turning on according to the second power source voltage.

The second sequential driver may further include a fifteenth switch for transmitting the first power source voltage to a drain electrode of the twelfth switch according to the second power source voltage.

The fifteenth switch may include at least two transistors that are coupled in series. The at least two transistors are for turning on according to the second power source voltage.

The second sequential driver may further include a third capacitor and a fourth capacitor. The third capacitor includes one terminal coupled to a third node for transmitting a voltage for controlling a switching operation of the tenth switch and another terminal coupled to the first power source. The fourth capacitor includes one terminal coupled to a fourth node for transmitting a voltage for controlling a switching operation of the eleventh switch and another terminal coupled to an output terminal of the second sequential driver.

The tenth switch may include a first electrode coupled to the first power source and a second electrode coupled to the output terminal. The eleventh switch may include a first electrode coupled to the output terminal and a second electrode for receiving the first clock signal.

The scan lines may further include a plurality of second scan lines for transmitting an initialization signal to the plurality of pixels. The pixel may further include a second switch for transmitting an initialization voltage to the second terminal. The scan driver may be further for generating the initialization signal for controlling a switching operation of the second switch, and for transmitting the initialization signal to the second scan lines.

The initialization signal may be another one of the scan signals transmitted at an earlier time corresponding to the at least two pulses than a time of the one of the plurality of scan signals.

The period of one of the at least two pulses may be more than one horizontal period.

According to another exemplary embodiment of the present invention, a pixel is provided. The pixel includes an organic light emitting diode (OLED), a driving transistor, a first transistor, and a first capacitor. The driving transistor is for transmitting a driving current to the OLED according to a data signal. The first transistor is for transmitting the data signal to the driving transistor according to a scan signal. The first capacitor includes a first terminal coupled to the first transistor and a second terminal coupled to a gate electrode of the driving transistor. The driving transistor is further for diode-connecting according to a threshold voltage compensation signal during a threshold voltage compensation period to compensate for a threshold voltage of the driving transistor. The threshold voltage compensation signal comprises at least two pulses.

The pixel may further include a first switch for diode-connecting the driving transistor according to the threshold voltage compensation signal.

The gate electrode of the driving transistor may be for receiving an initialization voltage during an initialization period for initializing a gate electrode voltage of the driving transistor. The initialization period is before the threshold voltage compensation period.

The pixel may further include a first switch, a second switch, and a third switch. The first switch is for diode-connecting the driving transistor according to the threshold voltage compensation signal. The second switch is for transmitting the initialization voltage to the gate electrode of the driving transistor during the initialization period. The third switch is for transmitting an assistance voltage to the first terminal of the first capacitor according to the threshold voltage compensation signal.

The first and third switches may be for receiving the threshold voltage compensation signal from a scan driver for generating and transmitting the scan signal, the threshold voltage compensation signal, and an initialization signal for controlling a switching operation of the second switch. The second switch may be further for receiving the initialization signal from the scan driver.

The initialization signal may be another scan signal transmitted at an earlier time corresponding to the at least two pulses than a time of the scan signal.

The pixel may further include a first switch for diode-connecting the driving transistor according to the threshold voltage compensation signal. The scan signal may be the threshold voltage compensation signal. The OLED may be for emitting light according to the data signal when a final pulse of the at least two pulses is transmitted.

The pixel may further include a second switch and a third switch. The second switch is for transmitting an initialization voltage to the gate electrode of the driving transistor during an initialization period for initializing a gate electrode voltage of the driving transistor. The third switch is for transmitting an assistance voltage to the first terminal of the first capacitor according to a light emission control signal of a next pixel row during the initialization period.

The period of one of the at least two pulses may be more than one horizontal period.

According to yet another exemplary embodiment of the present invention, a method for driving a display device is provided. The display device includes a plurality of pixels and a scan driver. The scan driver is for transmitting a plurality of scan signals and a plurality of threshold voltage compensation signals comprising at least two pulses to the pixels. Each of the pixels includes an organic light emitting diode (OLED), a driving transistor, a first transistor, and a first capacitor. The driving transistor is for controlling a current supplied to the OLED. The first transistor is for transmitting a data signal to the driving transistor. The first capacitor is coupled between the driving transistor and the first transistor. The method includes initializing a gate voltage of the driving transistor, compensating a threshold voltage of the driving transistor, transmitting the data signal to the driving transistor through the first capacitor, and diode-connecting the driving transistor according to one of the threshold voltage compensation signals during a threshold voltage compensation period that includes the at least two pulses.

The initializing of the gate voltage may include applying an initialization voltage to a second terminal of the first capacitor coupled to a gate electrode of the driving transistor.

The compensating of the threshold voltage may include applying an assistance voltage to a first terminal of the first capacitor coupled to the first transistor, diode-connecting the driving transistor, and charging a voltage corresponding to the threshold voltage of the driving transistor to a storage capacitor coupled between a gate electrode of the driving transistor and a first power source.

The method may further include transmitting the data signal during the threshold voltage compensation period, transmitting one of the scan signals to the first transistor, and emitting light by the OLED according to the data signal when a final of the at least two pulses is transmitted. The one of the scan signals may be the one of the threshold voltage compensation signals.

The scan driver may be further for generating the one of the threshold voltage compensation signals by receiving a start signal, a first clock signal, a second clock signal, a first initialization signal, and a second initialization signal; and for sequentially shifting the start signal by a first period. The start signal includes the at least two pulses. The second clock signal has a phase difference of a half cycle from the first clock signal. The first initialization signal is generated concurrently with the second clock signal. The second initialization signal is generated concurrently with the first clock signal.

The scan driver may be further for generating the plurality of threshold voltage compensation signals by receiving a first input signal comprising the at least two pulses concurrently with the first clock signal, outputting one of the second clock signal or a first power source voltage according to the first input signal and the first initialization signal as a plurality of first threshold voltage compensation signals of the threshold voltage compensation signals, receiving a second input signal comprising the at least two pulses concurrently with the second clock signal, and outputting one of the first clock signal or the first power source voltage according to the second input signal and the second initialization signal as a plurality of second threshold voltage compensation signals of the threshold voltage compensation signals.

The scan driver may include a plurality of sequential drivers for transmitting the threshold voltage compensation signals. The first input signal may be the start signal or one of the second threshold voltage compensation signals of one of the sequential drivers directly before another of the sequential drivers for transmitting the first input signal.

The scan driver may include a plurality of sequential drivers for transmitting the threshold voltage compensation signals. The second input signal may be one of the first threshold voltage compensation signals of one of the sequential drivers directly before another of the sequential drivers for transmitting the second input signal.

The period of one of the at least two pulses may be more than one horizontal period.

According to exemplary embodiments of a pixel, a display device including the same, and a driving method thereof, sufficient time to compensate the threshold voltages of the driving transistors may be obtained under high resolution and high frequency driving to realize a display device of high image quality. Accordingly, in embodiments of the driving circuit of the pixel using the high resolution and high frequency driving method, a compensation period of the threshold voltage of the driving transistor is sufficient such that the plurality of pixels of an exemplary display device respectively have a complete threshold voltage compensation capacity, and thereby the display device may realize a high quality display.

BRIEF DESCRIPTION OF THE DRAWINGS

The accompanying drawings, together with the specification, illustrate exemplary embodiments of the present invention, and, together with the description, serve to explain the principles of embodiments of the present invention.

DETAILED DESCRIPTION

Figure 1:
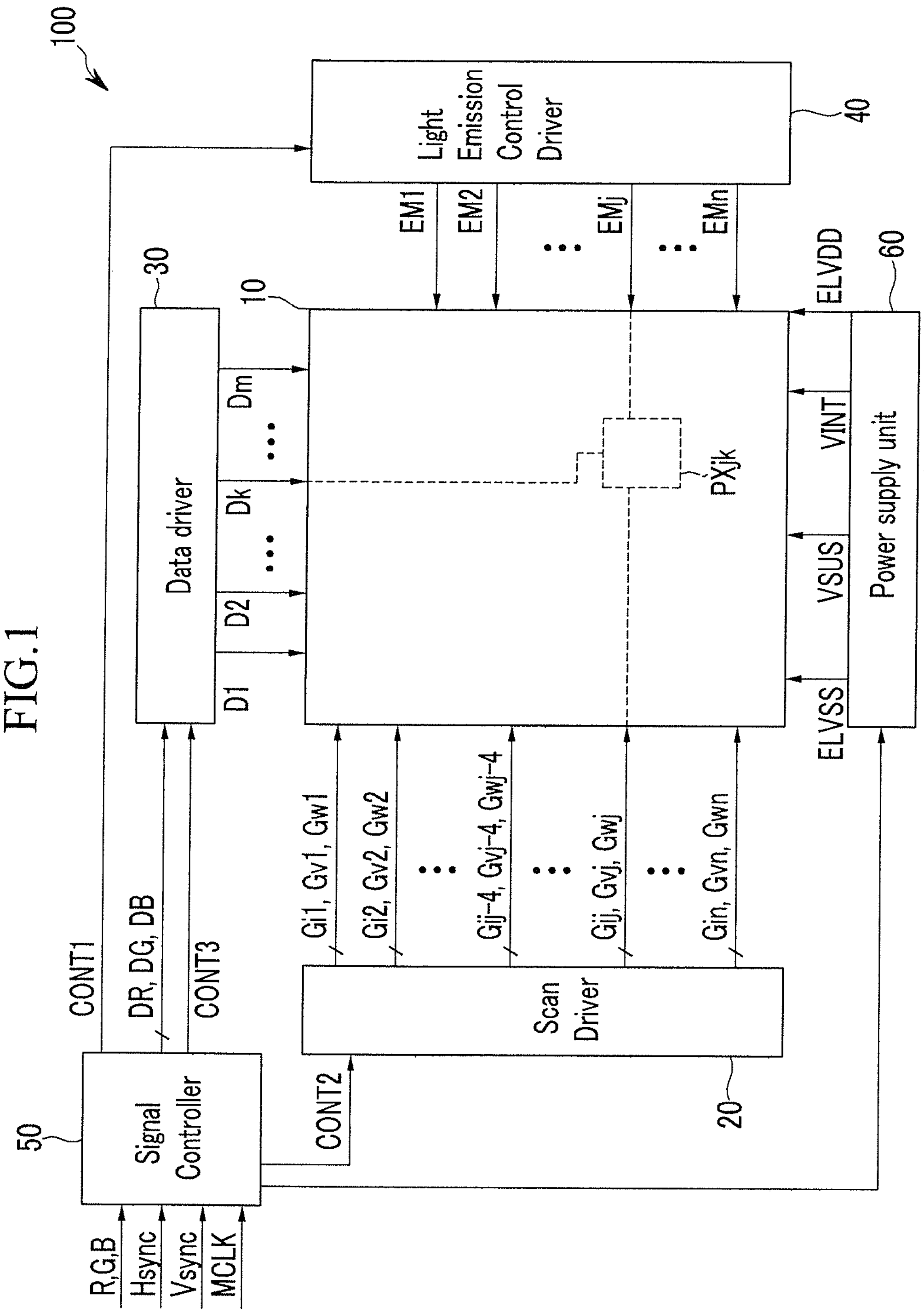
FIG. 1 is a block diagram of a display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in several exemplary embodiments, constituent elements having the same construction are assigned the same reference numerals and are representatively described in connection with a first exemplary embodiment. In the remaining exemplary embodiments, only different constituent elements from those of the first exemplary embodiment are described. In addition, to clarify the description of embodiments of the present invention, parts not related to the description are omitted, and the same reference numbers are used throughout the drawings to refer to the same or like parts. Further, power sources and their corresponding voltages may be referred to with the same reference name where the appropriate meaning is apparent from context.

Throughout this specification and the claims that follow, when it is described that an element is "coupled" to another element, the element may be directly coupled (e.g., connected) to the other element or indirectly coupled (e.g., electrically coupled or electrically connected) to the other element through one or more third elements. In addition, unless explicitly described to the contrary, the word "comprise" and variations such as "comprises" or "comprising" will be understood to imply the inclusion of stated elements but not the exclusion of any other elements.

FIG. 1 is a block diagram of a display device 100 according to an exemplary embodiment of the present invention.

Referring to FIG. 1, the display device 100 includes a display unit 10 including a plurality of pixels PXjk coupled to a plurality of scan lines Gi1 to Gin, Gv1 to Gvn, and Gw1 to Gwn, a plurality of light emission control lines EM1 to Emn, and a plurality of data lines D1 to Dm; a scan driver 20 for providing scan signals to each pixel PXjk through the plurality of scan lines Gi1 to Gin, Gv1 to Gvn, and Gw1 to Gwn; a light emission control driver 40 for providing light emission control signals to each pixel PXjk through the plurality of light emission control lines EM1 to EMn; a data driver 30 for providing data signals to each pixel PXjk through the plurality of data lines D1 to Dm; and a signal controller 50 for controlling the signals that are generated in and transmitted from the scan driver 20, the data driver 30, and the light emission control driver 40.

Also, the display unit 10 includes the plurality of pixels PXjk located in crossing regions of the scan lines Gi1 to Gin, Gv1 to Gvn, and Gw1 to Gwn, the data lines D1 to Dm, and the light emission control lines EM1 to EMn. The pixels PXjk are supplied with a first power source voltage ELVDD, a second power source voltage ELVSS, an initialization voltage VINT, and an assistance voltage VSUS from a power supply unit 60 controlled through the signal controller 50.

In the display unit 10, the plurality of pixels PXjk are arranged substantially in a matrix including rows and columns. In the arrangement of the pixels PXjk, the plurality of scan lines Gi1 to Gin, Gv1 to Gvn, and Gw1 to Gwn for transmitting the scan signals extend substantially in a row direction so as to be substantially parallel to each other, and the plurality of data lines D1 to Dm extend substantially in a column direction so as to be substantially parallel to each other. However, the present invention is not limited thereto.

In the exemplary embodiment of FIG. 1, for the plurality of scan lines Gi1 to Gin, Gv1 to Gvn, and Gw1 to Gwn coupled to the plurality of pixels PXjk, three scan lines (for example, Gi1, Gv1, and Gw1) are coupled to the corresponding pixels that are arranged in one pixel row (row 1, in this example). However, this is only one exemplary embodiment and the invention is not limited thereto, and at least three scan lines may be coupled to the corresponding pixels.

The pixels PXjk supply current to the organic light emitting diodes (OLEDs) according to the corresponding data signals, and the OLEDs emit light of a particular luminance (for example, a predetermined luminance) according to the supplied current.

Figure 2:
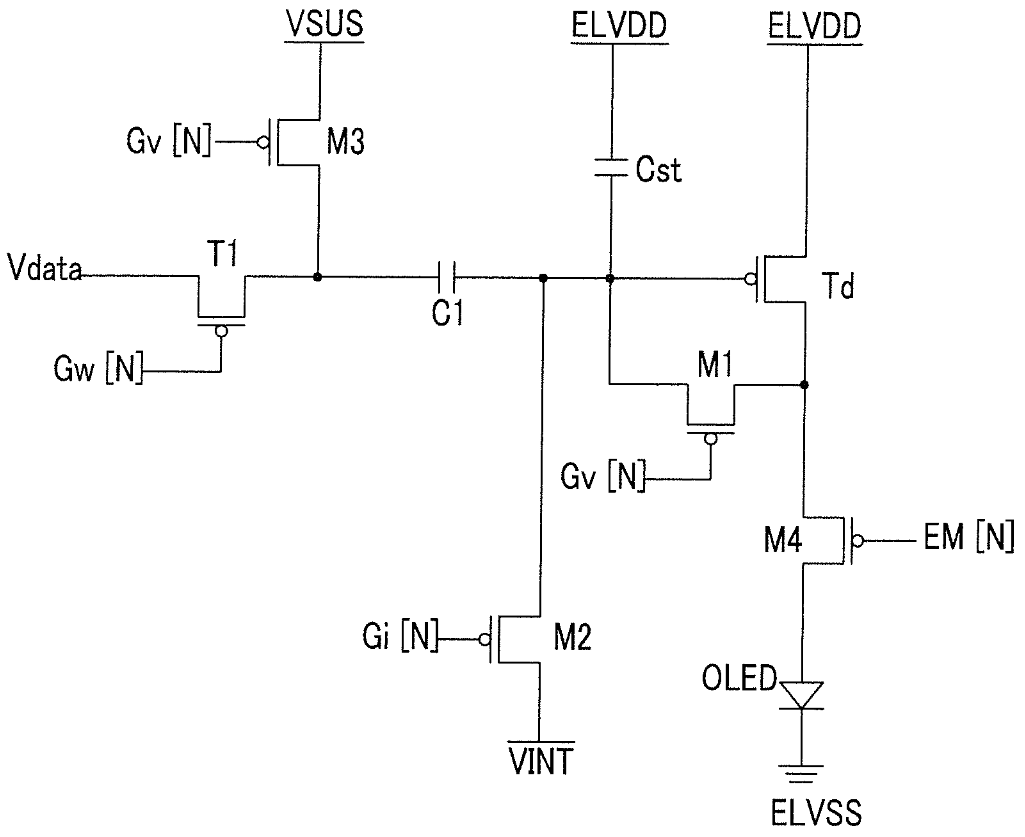
FIG. 2 is a circuit diagram showing a configuration of the pixel shown in FIG. 1 according to an exemplary embodiment.

FIG. 2 is a circuit diagram showing a configuration of the pixel PXjk shown in FIG. 1 according to an exemplary embodiment.

Referring to FIG. 2, each pixel PXjk of FIG. 1 is coupled to the three j-th (j=1, 2, . . . , n) scan lines Gij, Gvj, and Gwj for transmitting initialization signal Gi[N] (also denoted Gi or Gi[j]), threshold voltage compensation signal Gv[N] (also denoted Gv or Gv[j]), and scan signal Gw[N] (also denoted Gw or Gw[j]), respectively; the j-th (j=1, 2, . . . , n) light emission control line Emj for transmitting a light emission control signal EM[N] (also denoted EM or EM[j]); and the k-th (k=1, 2, . . . , m) data line Dk for transmitting a data signal Vdata (also denoted D[N]).

The pixel PXjk includes an organic light emitting diode (OLED), a driving transistor Td coupled to an anode of the OLED through a fourth switch M4, a first transistor T1 coupled to a gate electrode of the driving transistor Td through a first capacitor C1, the first capacitor C1 including a first electrode (or terminal) coupled to a drain electrode of the first transistor T1 and a second electrode (or terminal) coupled to the gate electrode of the driving transistor Td, a storage capacitor Cst coupled between the gate electrode of the driving transistor Td and the first power source ELVDD, a first switch M1 for diode-connecting the driving transistor Td, a second switch M2 for transmitting the initialization voltage VINT to the second electrode of the first capacitor C1, a third switch M3 for transmitting the assistance voltage VSUS to the first electrode of the first capacitor C1, and the fourth switch M4 having a source electrode coupled to a drain electrode of the driving transistor Td.

The OLED of the pixel PXjk includes the anode coupled to a drain electrode of the fourth switch M4 and a cathode coupled to the second power source ELVSS, and emits light by a driving current according to the corresponding data signal Vdata.

The driving transistor Td includes a source electrode coupled to the first power source ELVDD, the drain electrode coupled to the source electrode of the fourth switch M4, and the gate electrode coupled to the node where the second electrode of the first capacitor C1 and a drain electrode of the second switch M2 meet each other, and thereby a voltage corresponding to the data signal Vdata is transmitted to the driving transistor Td. The driving transistor Td then transmits the driving current (according to the data signal Vdata transmitted) to the OLED through the fourth switch M4.

The first transistor T1 includes a source electrode coupled to the data line Dk for transmitting the data signal Vdata, the drain electrode coupled to the node where the first electrode of the first capacitor C1 and a drain electrode of the third switch M3 meet each other, and the gate electrode coupled to the scan line Gwj for transmitting the scan signal Gw. When the scan signal Gw is transmitted through the scan line Gwj, the first transistor T1 is turned on, the data signal Vdata is transmitted to the first capacitor C1, and the voltage corresponding to the data signal Vdata is transmitted to the gate electrode of the driving transistor Td according to the voltage charged to the first capacitor C1.

In detail, the first capacitor C1 includes the first electrode coupled to the drain electrode of the first transistor T1 and the second electrode coupled to the gate electrode of the driving transistor Td. The storage capacitor Cst includes one terminal coupled to the node where the gate electrode of the driving transistor Td and a drain electrode of the first switch M1 meet each other, and the other terminal coupled to the first power source ELVDD. The storage capacitor Cst maintains the difference of the gate electrode voltage and the source electrode voltage of the driving transistor Td.

If the data signal Vdata is transmitted to the first electrode of the first capacitor C1, the second electrode voltage of the first capacitor C1, that is, the voltage of the node coupled to the first capacitor C1 and the storage capacitor Cst, is changed by a voltage ΔV that is the change of the first electrode voltage of the first capacitor C1 divided according to the capacitance ratio of the first capacitor C1 and the storage capacitor Cst. This is represented by Equation 1.

$$\Delta V=(V\text{data}-VSUS)(C2/(C1+C2)) \quad \text{Equation 1}$$

where Vdata is the voltage of the data signal, and C1 and C2 are the capacitances of the first capacitor C1 and the storage capacitor Cst, respectively.

After a threshold voltage compensation period, the gate electrode voltage of the driving transistor Td is the threshold voltage compensation voltage, which is the first power source voltage ELVDD offset by the threshold voltage Vth of the driving transistor Td. Once the data signal Vdata is transmitted, the gate electrode voltage of the driving transistor Td becomes the voltage that is changed by ΔV from the threshold voltage compensation voltage. Accordingly, after the data signal Vdata is transmitted to the driving transistor Td, the gate voltage VG of the driving transistor Td is as shown in Equation 2.

$$VG=ELVDD+\Delta V+Vth \quad \text{Equation 2}$$

Here, the driving transistor is a PMOS transistor such that the threshold voltage Vth has a negative value. This voltage VG is the voltage corresponding to the above-mentioned data signal Vdata, and the storage capacitor Cst maintains the difference between this voltage and the first power source voltage ELVDD until the next data signal is input.

That is, if the data signal Vdata is transmitted, the voltage that is applied to the gate electrode of the driving transistor Td is changed by the voltage ΔV corresponding to the difference between the data signal Vdata and the assistance voltage VSUS, compared with the voltage after the threshold voltage compensation period, namely the threshold voltage compensation voltage. This changed voltage is then transmitted to the gate electrode of the driving transistor Td, and the voltage difference between the gate electrode and the source electrode of the driving transistor Td is uniformly maintained by the storage capacitor Cst.

The pixel PXjk according to an exemplary embodiment of the present invention includes a switch for transmitting an initialization voltage during an initialization period in which the gate voltage of the driving transistor Td is initialized.

The switch for transmitting the initialization voltage VINT is the second switch M2 in the exemplary embodiment of FIG. 2. The second switch M2 includes a source electrode coupled to an initialization power source that transmits the initialization voltage VINT, the drain electrode coupled to the node of the second electrode of the first capacitor C1, and the gate electrode coupled to the scan line Gij to which the initialization signal Gi is transmitted. If the second switch M2 is turned on by the initialization signal Gi, the initialization voltage VINT is transmitted to the second electrode of the first capacitor C1.

Also, the pixel PXjk according to an exemplary embodiment of the present invention includes the first switch M1 for diode-connecting the driving transistor Td to compensate the threshold voltage of the driving transistor Td, and the third switch M3 for transmitting the assistance voltage VSUS during the threshold voltage compensation period.

The first switch M1 is controlled by the threshold voltage compensation signal Gv and is turned on during the period that the driving transistor Td is diode-connected such that the driving transistor threshold voltage is compensated. Since the third switch M3 is also controlled by the threshold voltage compensation signal Gv during the threshold voltage compensation period, the third switch M3 is concurrently (for example, simultaneously) turned on, and the assistance voltage VSUS is then transmitted from the assistance power source.

That is, the driving transistor Td is diode-connected by the turn-on of the first switch M1 during the threshold voltage compensation period such that the first power source voltage ELVDD is decreased by the threshold voltage of the driving transistor Td and then transmitted to the gate electrode of the driving transistor Td. During this period, the third switch M3 also receives the threshold voltage compensation signal Gv that is transmitted to the first switch M1, thereby turning on the third switch M3 such that the third switch M3 transmits the assistance voltage VSUS to the first electrode of the first capacitor C1.

As mentioned above, in the case that the assistance voltage VSUS is concurrently (for example, simultaneously) input to the first electrode of the first capacitor C1 during the threshold voltage compensation period, floating of the first electrode of the first capacitor C1 may be prevented. Thus, in an exemplary embodiment of the present invention to solve the problem that the length of the threshold voltage compensation period is reduced under the high resolution and the frequency driving of the pixel such that the image quality is deteriorated, the assistance voltage VSUS is applied during the threshold voltage compensation period such that a relatively long threshold voltage compensation period is ensured. Therefore, the stable circuit driving may be realized.

In detail, the first switch M1 includes a source electrode coupled to the drain electrode of the driving transistor Td, the drain electrode coupled to the gate electrode of the driving transistor Td, and a gate electrode coupled to the scan line Gvj to which the threshold voltage compensation signal Gv is transmitted. The third switch M3 includes a source electrode coupled to the assistance power source that transmits the assistance voltage VSUS, the drain electrode coupled to the node with the first electrode of the first capacitor C1, and the gate electrode coupled to the scan line Gvj to which the threshold voltage compensation signal Gv is transmitted.

The signal controlling the turn-on of the first switch M1 and the third switch M3 for compensating the threshold voltage of the driving transistor Td and for applying the assistance voltage VSUS, respectively, during the threshold voltage compensation period is the threshold voltage compensation signal Gv. In an exemplary embodiment of the present invention, the threshold voltage compensation signal Gv is a signal including at least two pulses and is generated and transmitted independently from the scan signal Gw generated in the scan driver 20.

On the other hand, the initialization signal Gi that is transmitted to the second switch M2 may be a signal that is generated independently from the scan signal Gw generated in the scan driver 20 of the display device according to an exemplary embodiment of the present invention, and is transmitted by the plurality of scan lines Gi1 to Gin. That is, the scan line Gwj coupled to the pixel PXjk of FIG. 2 further includes a second scan line Gij for transmitting the initialization signal Gi[N] and a third scan line Gvj for transmitting the threshold voltage compensation signal Gv[N].

The scan driver 20 generates the initialization signal Gi for controlling the switching operation of the second switch M2 for transmitting the initialization voltage VINT to the second electrode of the first capacitor C1 in the pixel PXjk. The scan driver 20 also generates the threshold voltage compensation signal Gv including at least two pulses and for controlling the switching operation of the first switch M1 for diode-connecting the driving transistor Td for the threshold voltage compensation. In addition, the threshold voltage compensation signal Gv is for controlling the third switch M3 for transmitting the assistance voltage VSUS to the first electrode of the first capacitor C1. The scan driver 20 also transmits the initialization signal Gi and the threshold voltage compensation signal Gv to the corresponding second and third scan lines.

On the other hand, as another exemplary embodiment, the initialization signal may be a scan signal (not shown) corresponding to a different scan line that is transmitted at an earlier time (depending, for example, on the number of pulses of the threshold voltage compensation signal Gv) than the time that the corresponding scan signal Gw among the plurality of scan signals generated in the scan driver 20 of the display device is transmitted to the scan line. For example, assume that the initialization signal is transmitted one cycle before the threshold voltage compensation period. Then, if the threshold voltage compensation period has a term in which the threshold voltage compensation signal Gv including four pulses is transmitted, and is the same as the period in which the four previous rows among a plurality of pixel rows are scanned, then the scan signal of the earlier time one cycle before the four threshold voltage compensation signal pulses are transmitted than the time in which the scan signal Gw[j] of the pixel PXjk shown in FIG. 2 is transmitted to the j-th scan line Gwj is scan signal Gw[j−5]. Accordingly, the scan signal Gw[j−5] may be transmitted instead of the initialization signal Gi[j] that is transmitted to the scan line Gij.

Here, the scan driver 20 further generates dummy scan signals to transmit to the first scan line Gi1 to the fifth scan line Gi5. In another exemplary embodiment of the present invention, the threshold voltage compensation period is determined as 4 horizontal periods in which one pulse is transmitted for 1 horizontal period and the signal including four pulses is transmitted. Accordingly, instead of the initialization signal Gi[j], the scan signal Gw[j−5] is transmitted. By this method, the appropriate scan signal Gw may be used instead of the initialization signal Gi according to the threshold voltage compensation period.

In addition, the pixel PXjk according to an exemplary embodiment of the present invention further includes the fourth switch M4 for transmitting the current generated corresponding to the data signal Vdata from the driving transistor Td to the OLED during the light emitting period. The switching operation of the fourth switch M4 is controlled by the light emission control signal EM[N], and if the fourth switch M4 is turned on by the light emission control signal EM[N] during the light emitting period, the current generated in the driving transistor Td is transmitted to the OLED. The fourth switch M4 includes the source electrode coupled to the drain electrode of the driving transistor Td, the drain electrode coupled to the anode of the OLED, and the gate electrode coupled to the light emission control line EMj.

In the above-described circuit shown in FIG. 2, the switches and the transistors included in the driving circuit diagram of the pixel are PMOS, however they are not limited, and they may be realized as NMOS.

In an exemplary embodiment of the present invention, the threshold voltage compensation period for the sufficient threshold voltage compensation is not particularly limited. However, it is a period in which the threshold voltage compensation signal Gv including at least two pulses is transmitted. Here, one pulse may be generated corresponding to at least one horizontal period such that the threshold voltage compensation period may be at least two horizontal periods 2H.

Accordingly, in an exemplary embodiment of the present invention, the threshold voltage compensation period is longer than the period in which the corresponding data signal Vdata is written, that is, the period in which the corresponding scan signal Gw among the plurality of scan signals is transmitted by the turn-on of the first transistor T1. In addition, when the initialization period is 1 horizontal period, the threshold voltage compensation period is more than 2 horizontal periods. Accordingly, the threshold voltage compensation period may be more than two times the initialization period.

Figure 3:
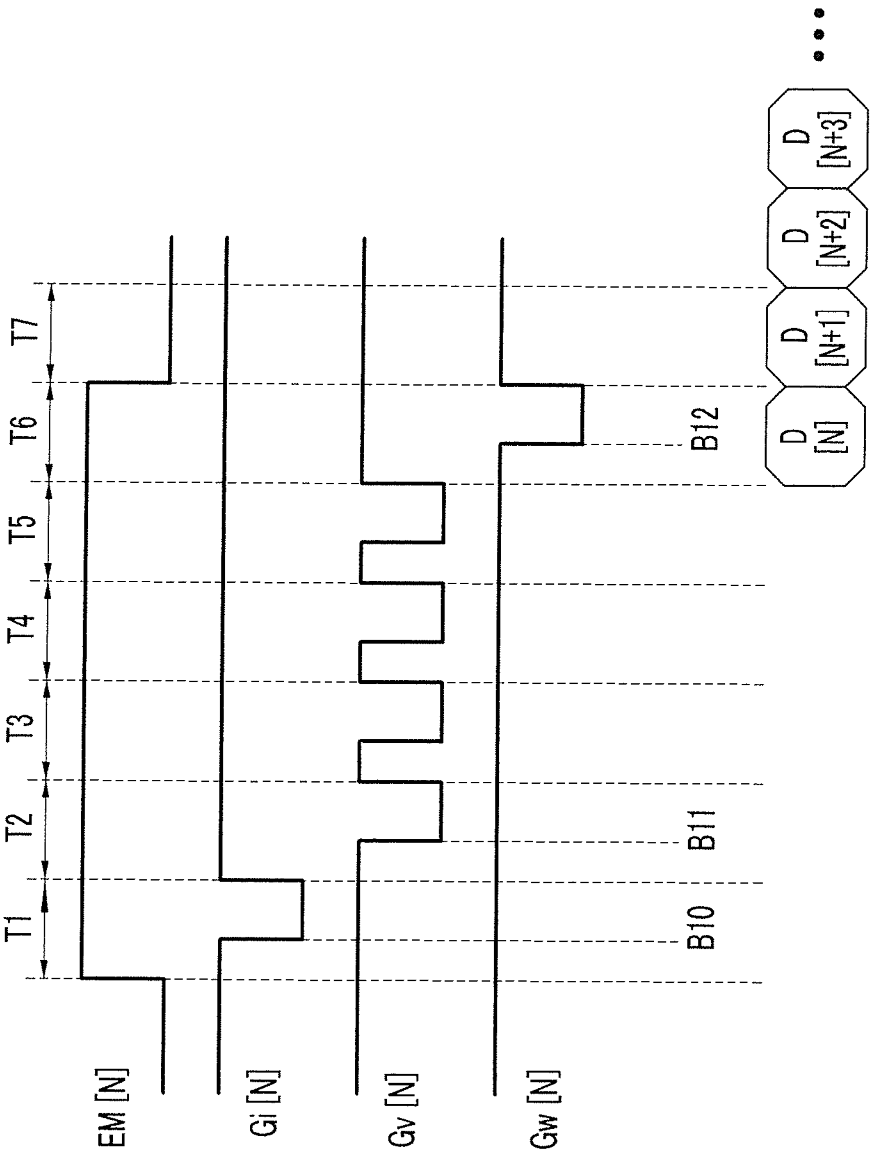
FIG. 3 to FIG. 5 are driving timing diagrams of the pixel shown in FIG. 2.
Figure 4:
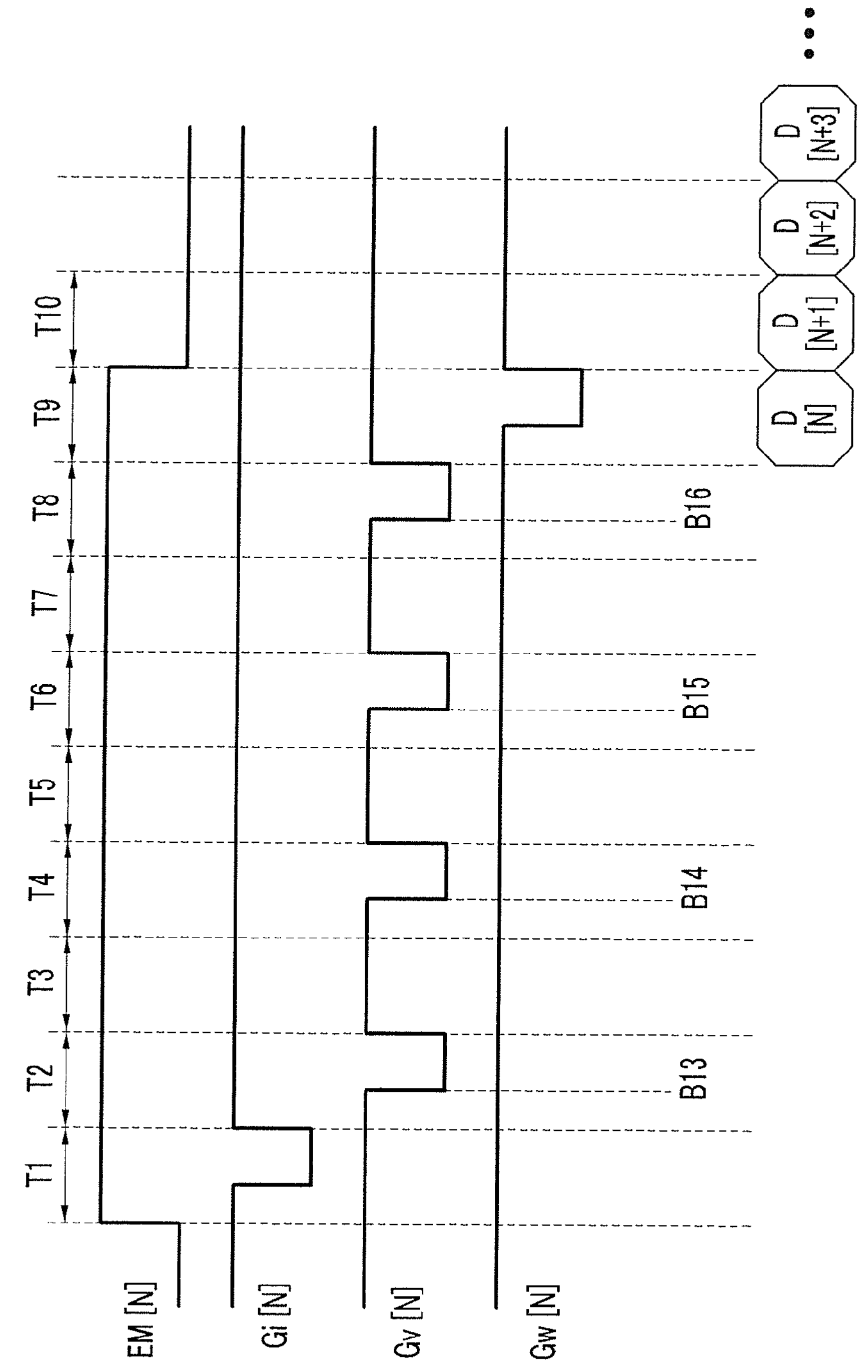
Figure 5:
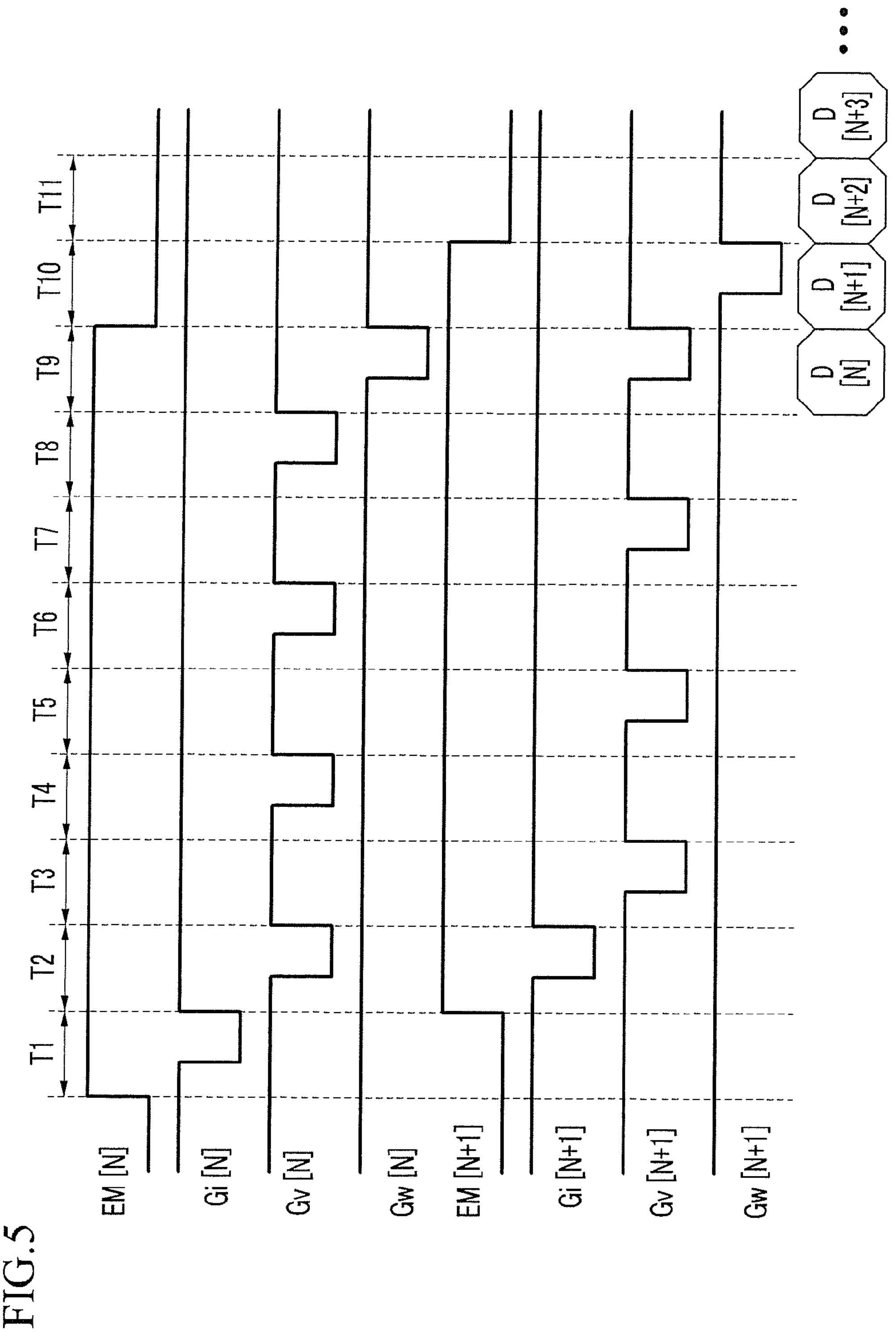

FIG. 3 to FIG. 5 are driving timing diagrams showing driving of a pixel of a display device according to an exemplary embodiment of the present invention.

FIG. 3 to FIG. 5 show signals that are transmitted to the pixel operated by the driving circuit shown in FIG. 2, and the transistors and the switches of the pixel of FIG. 2 are realized as PMOS transistors such that the driving timings shown in FIG. 3 to FIG. 5 are represented. If the transistors and switches of the pixel of FIG. 2 are NMOS transistors, the same operation as the driving of FIG. 3 to FIG. 5 is executed by signals that are inverted with respect to the corresponding signals of FIG. 3 to FIG. 5.

One period in FIG. 3 to FIG. 5 (e.g., period T1, period T2, etc.) is 1 horizontal period 1H. For example, 1 line time is 14.8 µs under FHD 60 Hz driving, however it is only half of that, 7.4 µs, under FHD 120 Hz driving at the high frequency (i.e., double the FHD 60 Hz driving frequency). In the driving timings of FIG. 3 to FIG. 5, a light emission control signal EM[N], an initialization signal Gi[N], a threshold voltage compensation signal Gv[N], and a scan signal Gw[N] are sequentially represented.

Referring to the timing diagram of FIG. 3, the light emission control signal EM[N] is increased (to a high state or level) during an interval T1-T6 (including the periods T1 through T6) such that the fourth switch M4 in the pixel driving circuit of FIG. 2 is turned off. Consequently, the light emitting of the OLED that was emitting light in the previous frame is blocked.

In addition, the other signals, except for the initialization signal Gi[N], are transmitted as the high state in the period T1 such that the first transistor T1, the first switch M1, and the third switch M3 of the pixel driving circuit of FIG. 2 are turned off. However, the initialization signal Gi[N] is decreased to a low level (that is lower than the high level) at a time B10 such that the second switch M2 in the pixel driving circuit of FIG. 2 is turned on during a sub-period B10-T1 (that is, from the time B10 until the end of the period T1).

Next, the initialization signal Gi[N] is increased at the end of the period T1 such that the second switch M2 of FIG. 2 becomes the off state. The threshold voltage compensation signal Gv[N] becomes the low level at a time B11 such that the first switch M1 and the third switch M3 of FIG. 2 become turned on. The light emission control signal EM and the scan signal Gw are the high level during the period T2 such that the fourth switch M4 remains turned off.

The driving transistor Td is diode-connected by the turn-on of the first switch M1 during a sub-period B11-T2 such that the node where the second electrode of the first capacitor C1 and one terminal of the storage capacitor Cst meet each other receives the voltage that is the first power source voltage ELVDD offset by the threshold voltage of the driving transistor. The third switch M3 is also turned on concurrently (for example, simultaneously) with this operation. Accordingly, the assistance voltage VSUS is transmitted to the first electrode of the first capacitor C1, which may prevent the first electrode of the first capacitor C1 from being floated.

The gate electrode voltage of the driving transistor Td may not reach the ELVDD+Vth voltage level by the capacitance of the first capacitor C1 and the storage capacitor Cst coupled to the gate electrode of the driving transistor Td and the parasitic capacitance electrically formed at the gate electrode during the sub-period B11-T2.

Accordingly, in an exemplary embodiment of the present invention, sufficient compensation time is ensured during an interval T2-T5 by using the threshold voltage compensation signal Gv[N] including four pulses of the low level.

As described above, the threshold voltage compensation period is the interval T2 to T5, and the threshold voltage compensation period is set by the number of pulses that are applied as the low level voltage.

In the exemplary embodiment of FIG. 3, it is set up that one pulse is generated within 1 horizontal period 1H, the threshold voltage compensation signal Gv[N] including four pulses is transmitted during the interval T2 to T5, and thereby each pulse is formed during 4 horizontal periods 4H except for the leading edge of each of the horizontal periods. The voltage charged by each pulse is maintained during the period (for example, a predetermined period) by the influence of the capacitors coupled to the gate electrode of the driving transistor Td, and the driving transistor Td is again diode-connected in that period such that a sufficient threshold voltage compensation period is provided. However, the present invention is not always limited thereto, and in other embodiments, the threshold voltage compensation period may be a period in which the threshold voltage compensation signal Gv[N] including at least two pulses is transmitted.

Also, as an exemplary embodiment of the present invention, the threshold voltage compensation period is longer than the period in which the scan signal Gw turns on the first transistor T1 such that the data signal Vdata is transmitted and the data information is written. In addition, as another exemplary embodiment, the threshold voltage compensation period may be longer than the initialization period.

The threshold voltage compensation signal Gv[N] is increased to the high level, and remains at the high level until the next frame, at the time that the period T5 is finished such that the first switch M1 and the third switch M3 of FIG. 2 become the off state. Then, the scan signal Gw[N] becomes the low level at the time B12, and thereby the first transistor T1 of FIG. 2 is turned on.

In the period T6, the corresponding data signal D[N] is transmitted from the data line Dk such that the gate electrode voltage of the driving transistor Td receives the voltage ΔV that reflects the corresponding data signal voltage Vdata, plus the first power source voltage ELVDD that is decreased by the threshold voltage of the driving transistor Td.

Next, the scan signal Gw[N] is increased to the high level at the time that the period T7 is started such that the first transistor T1 is turned off and the input of the changed voltage value ΔV that reflects the voltage value of the corresponding data signal D[N] is completed. Concurrently (for example, simultaneously), the light emission control signal EM[N] becomes the low level at the time that the period T7 is started such that the fourth switch M4 of FIG. 2 is turned on and the OLED emits light corresponding to the driving current according to the changed voltage value ΔV reflecting the voltage value of the corresponding data signal D[N].

The period T7 is the period after the period T6 in which the corresponding pixel among the plurality of pixels is written with the corresponding data signal D[N] in one frame such that the light is emitted by the driving current. In the circuit driving timing diagram of the exemplary embodiment of FIG. 3, it is shown that the scan signal Gw[N] and the light emission control signal EM[N] are low level at the times that a sub-period B12-T6 and the period T7, respectively, are started. However, in other embodiments, it may be that the signals Gw[N] and EM[N] become the low level concurrently (for example, simultaneously), and then the corresponding data signals are written at one period or one time, and concurrently the OLED directly emits the light.

The periods are repeated in the next frame such that the corresponding data information for the plurality of pixels is repeatedly written through the initialization step, the threshold voltage compensation step, and the scan step.

FIG. 4 is a driving timing diagram that is similar to the pixel driving timing diagram of the display device according to the exemplary embodiment of FIG. 3. Referring to FIG. 4, it may be confirmed that the threshold voltage compensation period is the period in which the threshold voltage compensation signal Gv[N] including four pulses is transmitted during an interval B13 to T8 (that is, from a time B13 until an end of the period T8).

Like the timing diagram according to the exemplary embodiment of FIG. 3, the threshold voltage compensation signal Gv[N] according to the exemplary embodiment of FIG. 4 includes four pulses of the low level. However, it is set up such that one pulse is generated within 2 horizontal periods 2H, which is different from the exemplary embodiment of FIG. 3, and the period of the threshold voltage compensation due to the threshold voltage compensation signal Gv[N] of FIG. 4 is doubled compared with the case of FIG. 3.

The threshold voltage compensation signal Gv[N] of the timing diagram of FIG. 4 includes the intervals that are increased to the high level voltage between the pulses of the low level, that is, the intervals T3-B14, T5-B15, and T7-B16, and the threshold voltage compensation is stopped during these intervals such that the capacity of the threshold voltage compensation is decreased. However, the pulse of the low level is transmitted at the times B14, B15, and B16 such that the threshold voltage compensations are sufficiently close to each other.

The set-up of the number of pulses of the threshold voltage compensation signal Gv[N] and the length of the horizontal period generated by the repeat of the pulses according to the exemplary embodiments of FIG. 3 and FIG. 4 are only two examples, and the present invention is not limited thereto. The number of pulses and the horizontal period generated by the repeating pulse may be variously determined.

The driving timing diagram of FIG. 5 shows the timing diagram of FIG. 4, which shows the signals that are transmitted to the N-th pixel row, as well as the same signals shifted by 1 horizontal period 1H, which represents the driving timing of the signals that are transmitted to the (N+1)-th pixel row (that is, the next pixel row). Accordingly, the detailed description of FIG. 5 is not repeated.

Figure 6:
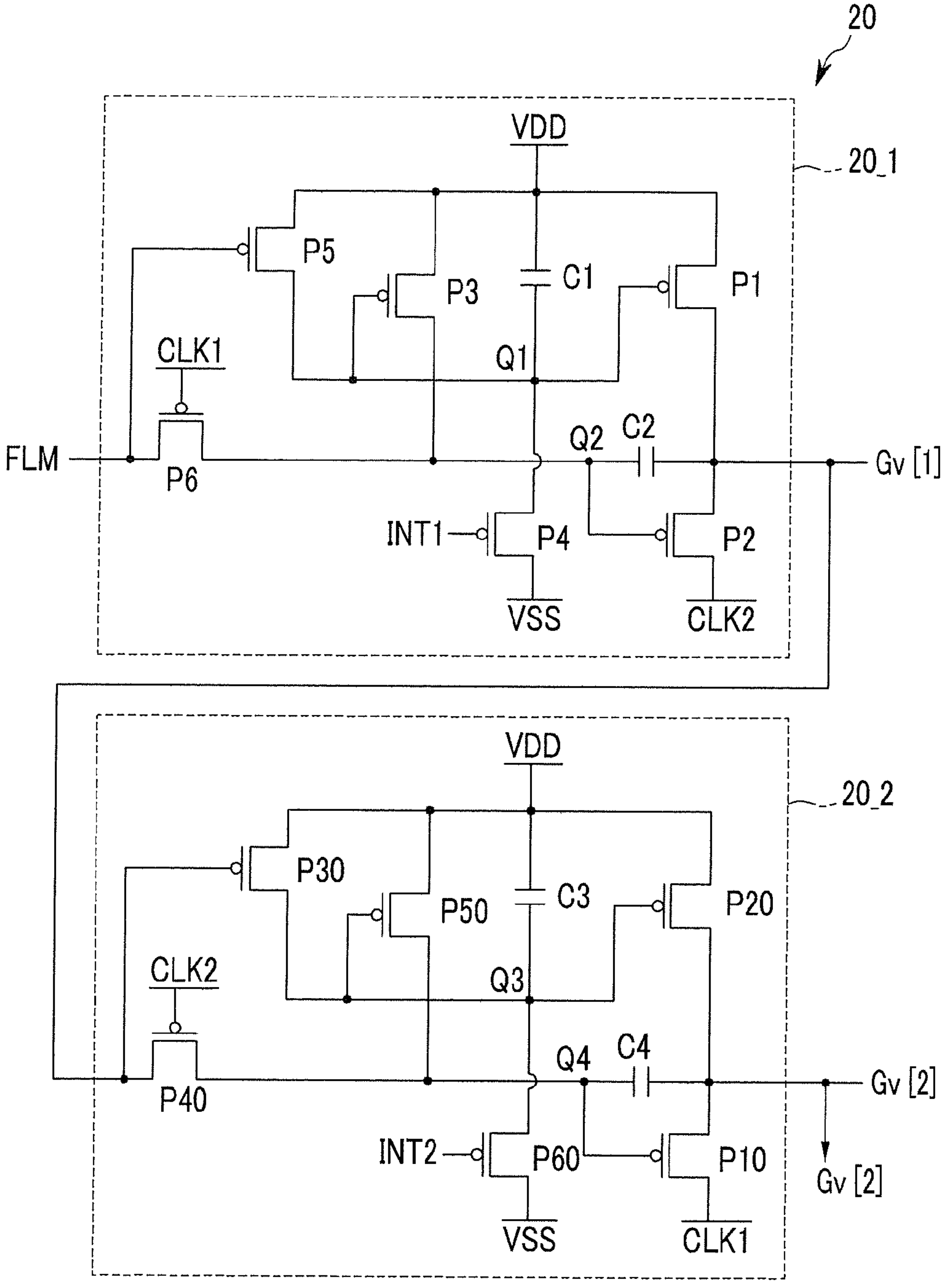
FIG. 6 is a circuit diagram of a configuration of the scan driver shown in FIG. 1 according to an exemplary embodiment.

FIG. 6 is a circuit diagram showing the configuration of the scan driver 20 shown in FIG. 1 according to an exemplary embodiment.

Referring to FIG. 6, the scan driver 20 of the display device includes a plurality of sequential drivers 20_1 to 20_*n* (such as sequential drivers 20_1 and 20_2 illustrated in FIG. 6). The plurality of sequential drivers 20_1 to 20_*n* include a plurality of sequential drivers 20_*x* (x is odd), hereinafter referred to as first sequential drivers, for generating the threshold voltage compensation signal Gv[x] transmitted to the plurality of pixels arranged in odd-numbered pixel rows among the plurality of pixel rows, and a plurality of sequential drivers 20_*y* (y is even), hereinafter referred to as second sequential drivers, for generating the threshold voltage compensation signal Gv[x] transmitted to the plurality of pixels arranged in even-numbered pixel rows among the plurality of pixel rows.

In the plurality of sequential drivers of FIG. 6, the first first sequential driver 20_1 of the first sequential drivers 20_*x* (x is odd) and the first second sequential driver 20_2 among the second sequential drivers 20_*y* (y is even) are representatively shown.

The scan driver 20 receives a start signal FLM of an input signal including at least two pulses, a first clock signal CLK1, a second clock signal CLK2 having a phase difference by a half cycle from the first clock signal CLK1, a first initialization signal INT1 generated concurrently (for example, in synchronization) with the second clock signal CLK2, and a second initialization signal INT2 concurrently (for example, in synchronization) with the first clock signal CLK1 to generate a plurality of threshold voltage compensation signals Gv[1] to Gv[n] by sequentially shifting the start signal FLM or the input signal by a first period (for example, a first predetermined period).

In detail, referring to FIG. 6, the first first sequential driver 20_1 among the plurality of first sequential drivers 20_*x* (x is odd) receives the start signal FLM including at least two pulses concurrently (for example, in synchronization) with the first clock signal CLK1, and outputs one of the second clock signal CLK2 and a first power source voltage VDD as the corresponding first threshold voltage compensation signal Gv[1] according to the start signal FLM and the first initialization signal INT1.

In FIG. 6, the first sequential drivers 20_3, 20_5, . . . (not shown) after the first first sequential driver 20_1 among the plurality of first sequential drivers 20_*x* (x is odd) receive a first input signal including at least two pulses instead of the start signal FLM. Here, for each such first sequential driver 20_*x*, the first input signal is the same as the threshold voltage compensation signal Gv[x−1] of the second sequential driver 20_*x*−1 (x−1 is even since x is odd) among the plurality of second sequential drivers 20_*y* (y is even) that is earlier than and adjacent to the first sequential driver 20_*x*.

On the other hand, the first second sequential driver 20_2 among the plurality of second sequential drivers 20_*y* (y is even) receives a second input signal (namely, the threshold voltage compensation signal Gv[1] of the first first sequential driver 20_1) including at least two pulses concurrently (for example, in synchronization) with the second clock signal CLK2, and outputs one of the first clock signal CLK1 and the first power source voltage VDD as the second threshold voltage compensation signal Gv[2] according to the second input signal and the second initialization signal INT2. The second threshold voltage compensation signal Gv[2] then becomes the first input signal of the next first sequential driver 20_3 (not shown).

In FIG. 6, the second sequential drivers 20_4, 20_6, . . . (not shown) after the first second sequential driver 20_2 among the plurality of second sequential drivers 20_*y* (y is even) receive the second input signal including at least two pulses. The second input signal is the same as the threshold voltage compensation signal Gv[y−1] of the first sequential driver 20_*y*−1 (y−1 is odd since y is even) among the plurality of first sequential drivers 20_*x* (x is odd) that is earlier than and adjacent to the corresponding second sequential driver 20_*y*.

Next, the configuration of the first sequential driver 20_1 and the second sequential driver 20_2 shown in FIG. 6 among the sequential drivers 20_1 to 20_*n* will be described in detail.

The first sequential driver 20_1 includes a plurality of first to sixth transistors (or switches) P1-P6 and a plurality of first and second capacitors C1 and C2. Here, the plurality of first to sixth transistors P1-P6 may be PMOS transistors. However, the invention is not always limited thereto. In the configuration of the circuit of FIG. 6, the PMOS transistors are used as switches. The PMOS transistors include gate, source, and drain electrodes, and an electrical connection degree (or conductivity) is determined according to a difference between a voltage that is input to the gate electrode and a voltage of the source electrode.

The first transistor P1 includes a source electrode coupled to the first power source VDD, a gate electrode coupled to a first node Q1 where one terminal of the first capacitor C1 and a drain electrode of the fourth transistor P4 meet each other, and a drain electrode coupled to an output terminal of the first sequential driver 20_1. The first transistor P1 transmits the first power source voltage VDD to the corresponding threshold voltage compensation line Gv1 for transmitting the threshold voltage compensation signal Gv[1] to a plurality of pixels of a first pixel row among the plurality of pixel rows of the display unit of the display device and to the second sequential driver 20_2 adjacent to and after the first sequential driver 20_1 in response to the first initialization signal INT1.

The second transistor P2 includes a source electrode coupled to the second clock signal CLK2, a gate electrode coupled to one terminal of the second capacitor C2, and a drain electrode coupled to the output terminal of the corresponding first sequential driver 20_1. The second transistor P2 transmits the second clock signal CLK2 to the output terminal of the first sequential driver 20_1 in response to the start signal FLM.

The start signal FLM corresponds to the first input signal of the first first sequential driver 20_1 of the plurality of first sequential drivers 20_*x* (x is odd). The first input signal of each first sequential driver 20_*x* of the plurality of first sequential drivers 20_*x* except for the first first sequential driver 20_1 is the second threshold voltage compensation signal Gv[x−1] of the corresponding second sequential driver 20_*x*−1 among the plurality of second sequential drivers 20_*y* (y is even) that is earlier than and adjacent to the first sequential driver 20_*x*.

The third transistor P3 includes a source electrode coupled to the first power source VDD, a gate electrode coupled to the first node Q1 of one terminal of the first capacitor C1 and the drain electrode of the fourth transistor P4, and a drain electrode coupled to one terminal of the second capacitor C2. The third transistor P3 transmits the first power source voltage VDD to the second transistor P2 in response to the first initialization signal INT1. According to an exemplary embodiment, the third transistor P3 may include at least 2 transistors that are coupled in series. The at least 2 transistors may be turned on according to a second power source voltage VSS.

The fourth transistor P4 includes a source electrode coupled to the second power source VSS, a gate electrode coupled to the first initialization signal INT1, and the drain electrode coupled to the first node Q1 of one terminal of the first capacitor C1, the gate electrode of the first transistor P1, and the gate electrode of the third transistor P3. The fourth transistor P4 transmits the second power source voltage VSS to the first transistor P1 and the third transistor P3 according to the first initialization signal INT1.

Accordingly, the first transistor P1 is turned on according to the second power source voltage VSS and the third transistor P3 is also turned on according to the second power source voltage VSS such that the voltage level of the first threshold voltage compensation signal Gv[1] transmitted to the threshold voltage compensation line Gv1 and the connection line coupled to the second sequential driver 20_2 adjacent and after thereto is changed into the first power source voltage VDD level. In addition, the third transistor P3 is turned on and the first power source voltage VDD is transmitted to the second transistor P2 such that the second transistor P2 is turned off according to the first power source voltage VDD.

The fifth transistor P5 includes a source electrode coupled to the first power source VDD, a gate electrode coupled to the start signal FLM, and a drain electrode coupled to the first node Q1 of one terminal of the first capacitor C1, the gate electrode of the first transistor P1, and the gate electrode of the third transistor P3. The fifth transistor P5 transmits the first power source voltage VDD to the first transistor P1 according to the start signal FLM.

The sixth transistor P6 includes a source electrode coupled to the start signal FLM, a gate electrode coupled to the first clock signal CLK1, and a drain electrode coupled to one terminal of the second capacitor C2. The sixth transistor P6 transmits the start signal FLM to the second transistor P2 according to the first clock signal CLK1.

When the fifth transistor P5 and the sixth transistor P6 are turned on and the start signal FLM has a level (for example, a predetermined level, which when the switch is a PMOS transistor, is the low level) that turns on the fifth transistor P5, the first power source voltage VDD is transmitted to the gate electrode of the first transistor P1. Thus, the first transistor P1 is turned off according to the first power source voltage VDD. Also, the start signal FLM transmitted to the second transistor P2 is the low level such that the second transistor P2 is turned on, and thereby the voltage level of the first threshold voltage compensation signal Gv[1] transmitted to the threshold voltage compensation line Gv1 and the connection line coupled to the second sequential driver 20_2 adjacent and after thereto is transmitted the voltage level of the second clock signal CLK2.

The first capacitor C1 includes one terminal coupled to the first node Q1 of the gate electrode of the first transistor P1, the gate electrode of the third transistor P3, the drain electrode of the fourth transistor P4, and the drain electrode of the fifth transistor P5, and the other terminal coupled to the first power source VDD. The first node Q1 is transmitted the voltage for controlling the switching operation of the first transistor P1.

The second capacitor C2 includes one terminal coupled to the gate electrode of the second transistor P2, and the other terminal coupled to the drain electrode of the first transistor P1, the drain electrode of the second transistor P2, and the output terminal of the corresponding first sequential driver 20_1. A second node Q2 of one terminal of the second capacitor C2 and the gate electrode of the second transistor P2 is transmitted the voltage for controlling the switching operation of the second transistor P2.

For the first sequential driver 20_1 of the scan driver 20 according to an exemplary embodiment shown in FIG. 6, the first transistor P1 includes one terminal coupled to the first power source VDD and the other terminal coupled to the output terminal of the corresponding first sequential driver 20_1, and the second transistor P2 includes one terminal coupled to the output terminal of the corresponding first sequential driver 20_1 and the other terminal that is transmitted the second clock signal CLK2.

Next, the second sequential driver 20_2 of the scan driver 20 according to the exemplary embodiment of FIG. 6 includes a plurality of seventh through twelfth switches (or transistors) P10-P60 and a plurality of third and fourth capacitors C3 and C4. Here, the plurality of seventh through twelfth switches P10-P60 are PMOS transistors, however the invention is not always limited thereto.

The seventh transistor P10 includes a source electrode coupled to the first clock signal CLK1, a gate electrode coupled to one terminal of the fourth capacitor C4, and a drain electrode coupled to an output terminal of the second sequential driver 20_2. The output terminal of the corresponding second sequential driver 20_2 is the connection line coupled to the corresponding threshold voltage compensation line Gv2 for transmitting the threshold voltage compensation signal Gv[2] to a plurality of pixels of a second pixel row among the plurality of pixel rows of the display unit of the display device and to the first sequential driver 20_3 (not shown) adjacent to and after the second sequential driver 20_2. The seventh transistor P10 receives the first threshold voltage compensation signal Gv[1] transmitted from the first sequential driver 20_1 before and adjacent thereto as the second input signal, and transmits the first clock signal CLK1 to the output terminal of the corresponding the second sequential driver 20_2 in response thereto.

Each second sequential driver 20_*y* (y is even) of the plurality of second sequential drivers receives (as the second input signal) the first threshold voltage compensation signal Gv of the corresponding first sequential driver 20_*y*−1 among the plurality of first sequential drivers 20_*x* (x is odd) that is earlier than and adjacent to the second sequential driver 20_*y*.

The eighth transistor P20 includes a source electrode coupled to the first power source VDD, a gate electrode coupled to a third node Q3 of one terminal of the third capacitor C3 and a drain electrode of the twelfth transistor P60, and a drain electrode coupled to the output terminal of the corresponding second sequential driver 20_2. The eighth transistor P20 transmits the first power source voltage VDD to the output terminal of the corresponding second sequential driver 20_2 in response to the second initialization signal INT2.

The ninth transistor P30 includes a source electrode coupled to the first power source VDD, a gate electrode coupled to the second input signal, and a drain electrode coupled to the third node Q3 of one terminal of the third capacitor C3 and the gate electrode of the eighth transistor P20. The ninth transistor P30 transmits the first power source voltage VDD to the eighth transistor P20 according to the second input signal.

The tenth transistor P40 includes a source electrode coupled to the second input signal, a gate electrode coupled to the second clock signal CLK2, and a drain electrode coupled to one terminal of the fourth capacitor C4. The tenth transistor P40 transmits the second input signal to the seventh transistor P10 according to the second clock signal CLK2.

The ninth transistor P30 and the tenth transistor P40 are turned on when the second input signal and the second clock signal CLK2, respectively, are an appropriate level (for example, a predetermined level, which in the case that the switch is a PMOS transistor, is the low level), and the eighth transistor P20 is turned off according to the first power source voltage VDD. Also, the second input signal transmitted to the seventh transistor P10 is the low level and the seventh transistor P10 is turned on such that the voltage level of the second threshold voltage compensation signal Gv[2] transmitted to the output terminal of the corresponding second sequential driver 20_2 is the voltage level of the first clock signal CLK1.

The eleventh transistor P50 includes a source electrode coupled to the first power source VDD, a gate electrode coupled to the third node Q3 of one terminal of the third capacitor C3, the gate electrode of the eighth transistor P20, and the drain electrode of the ninth transistor P30, and a drain electrode coupled to one terminal of the fourth capacitor C4. The eleventh transistor P50 transmits the first power source voltage VDD to the seventh transistor P10 in response to the second initialization signal INT2. According to an exemplary embodiment, the eleventh transistor P50 may include at least 2 transistors that are coupled in series, and the at least 2 transistors may be turned on according to the second power source voltage VSS.

The twelfth transistor P60 includes a source electrode coupled to the second power source VSS, a gate electrode coupled to the second initialization signal INT2, and the drain electrode coupled to the third node Q3 of one terminal of the third capacitor C3, the gate electrode of the eighth transistor P20, the drain electrode of the ninth transistor P30, and the gate electrode of the eleventh transistor P50. The twelfth transistor P60 transmits the second power source voltage VSS to the eighth transistor P20 and the eleventh transistor P50 according to the second initialization signal INT2.

Accordingly, the eighth transistor P20 is turned on according to the second power source voltage VSS and the eleventh transistor P50 is turned on according to the second power source voltage VSS such that the voltage level of the second threshold voltage compensation signal Gv[2] transmitted to the output terminal of the corresponding second sequential driver 20_2 is changed into the first power source voltage VDD level. In addition, the eleventh transistor P50 is turned on and the seventh transistor P10 is transmitted the first power source voltage VDD such that the seventh transistor P10 is turned off according to the first power source voltage VDD.

The third capacitor C3 includes one terminal coupled to the third node Q3 of the gate electrode of the eighth transistor P20, the gate electrode of the eleventh transistor P50, the drain electrode of the ninth transistor P30, and the drain electrode of the twelfth transistor P60, and the other terminal coupled to the first power source VDD. The third node Q3 is transmitted the voltage for controlling the switching operation of the eighth transistor P20.

The fourth capacitor C4 includes one terminal coupled to the gate electrode of the seventh transistor P10, and the other terminal coupled to a node of the drain electrode of the eighth transistor P20, the drain electrode of the seventh transistor P10, and the output terminal of the corresponding second sequential driver 20_2. A fourth node Q4 of one terminal of the fourth capacitor C4 and the gate electrode of the seventh transistor P10 is transmitted the voltage for controlling the switching operation of the seventh transistor P10.

For the second sequential driver 20_2 of the scan driver 20 according to the exemplary embodiment shown in FIG. 6, the eighth transistor P20 includes one terminal coupled to the first power source VDD and the other terminal coupled to the output terminal of the corresponding second sequential driver 20_2, and the seventh transistor P10 includes one terminal coupled to the output terminal of the corresponding second sequential driver 20_2 and the other terminal transmitted the first clock signal CLK1.

Figure 7:
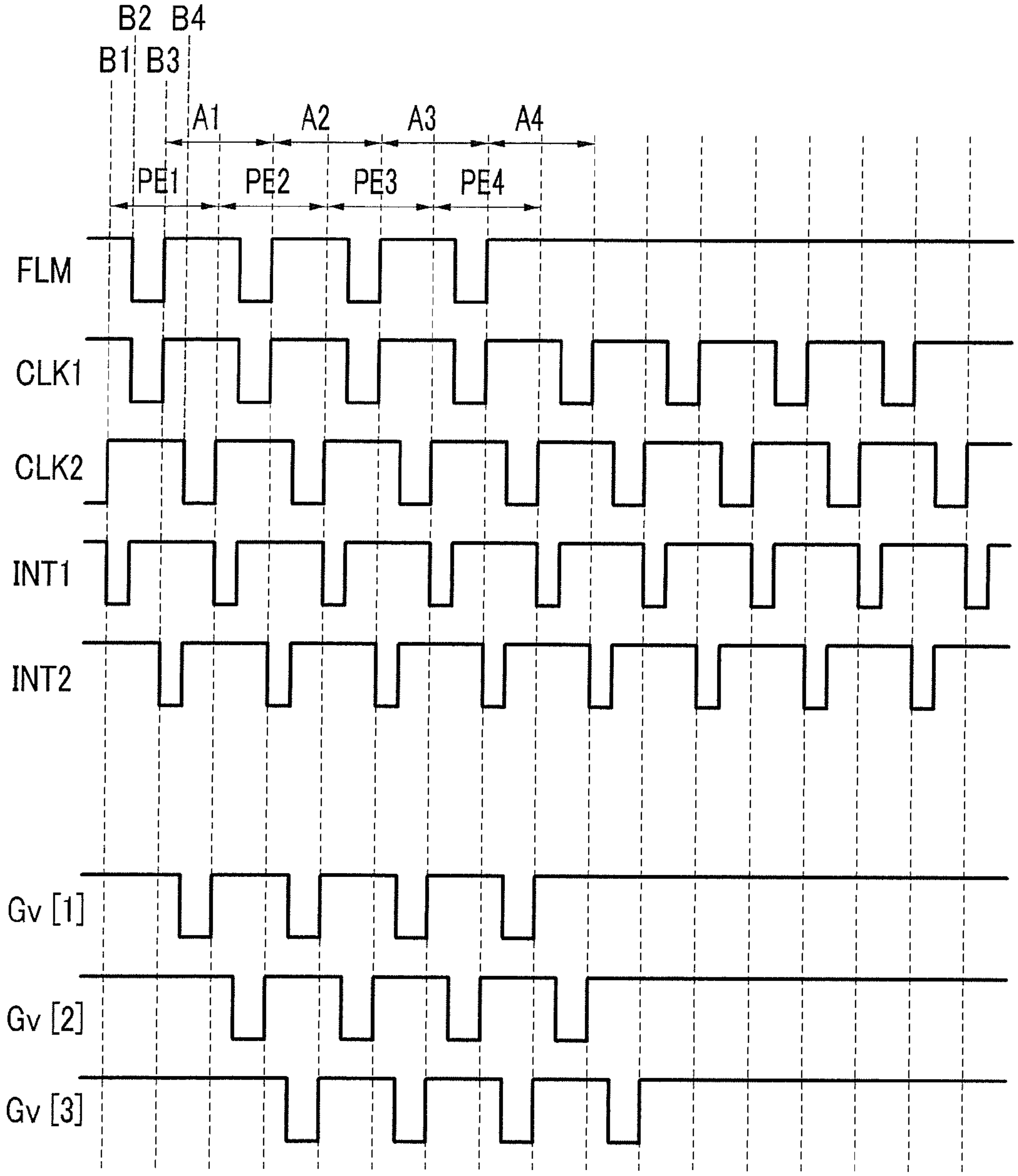
FIG. 7 is a driving timing diagram of the scan driver shown in FIG. 6.

FIG. 7 is the driving waveform diagram for explaining the driving of the scan driver shown in FIG. 6. FIG. 7 explains with reference to the detailed circuit of the scan driver 20 shown in FIG. 6. In FIG. 7, the periods PE1, PE2, PE3, and PE4 each represent one cycle of the first initialization signal INT1, and the periods A1, A2, A3, and A4 each represent one cycle of the second initialization signal INT2.

Referring to FIG. 7, at time B1, the first initialization signal INT1 is generated as a low-level pulse and transmitted to the fourth transistor P4 of the first sequential driver 20_1, which turns on the fourth transistor P4. Thus, the second power source voltage VSS is passed through the first node Q1 and transmitted to the first transistor P1 and the third transistor P3. Accordingly, the first transistor P1 and the third transistor P3 are turned on, and the first power source voltage VDD is passed through the first transistor P1 and transmitted to the output terminal of the first sequential driver 20_1, and the first power source voltage VDD is passed through the third transistor P3 and transmitted to the second transistor P2.

Therefore, the first threshold voltage compensation signal Gv[1] output from the output terminal of the first sequential driver 20_1 is the first power source voltage VDD level, and the second transistor P2 is turned off by the first power source voltage VDD level. The first threshold voltage compensation signal Gv[1] output from the output terminal of the first sequential driver 20_1 is concurrently transmitted as the second input signal of the second sequential driver 20_2 of the next sequential driver 20_2.

Next, at time B2, the start signal FLM and the first clock signal CLK1 are concurrently (for example, simultaneously) generated as low-level pulses, and the first initialization signal INT1 is increased to the high level. Thus, the fourth transistor P4 is turned off by the first initialization signal INT1 such that the first transistor P1 and the third transistor P3 are no longer transmitted the second power source voltage VSS, and thereby the first transistor P1 and the third transistor P3 are turned off. On the other hand, the fifth transistor P5 and the sixth transistor P6 are turned on. As a result, the first power source voltage VDD is passed through the fifth transistor P5 by the turn-on of the fifth transistor P5, and is passed through the first node Q1 and transmitted to the first transistor P1, thereby turning off the first transistor P1.

Concurrently (for example, simultaneously), the voltage level of the start signal FLM is transmitted to the second transistor P2 by the turn-on of the sixth transistor P6, and the voltage level of the start signal FLM is the low level such that the second transistor P2 is turned on. Accordingly, the second clock signal CLK2 is passed through the second transistor P2, transmitted to the output terminal of the first sequential driver 20_1, and output as the first threshold voltage compensation signal Gv[1]. Thus, the first threshold voltage compensation signal Gv[1] is generated as the second clock signal CLK2 during one cycle of the first initialization signal INT1, that is, the period PE1.

Next, the above process is repeated such that the first threshold voltage compensation signal Gv[1] is generated with the same pulse as the second clock signal CLK2 at the periods PE2, PE3, and PE4 concurrently (for example, in synchronization) with the trailing edge of the first initialization signal INT1.

In similar fashion, at time B3, the second initialization signal INT2 is generated as a low-level and transmitted to the twelfth transistor P60 of the second sequential driver 20_2, which turns on the twelfth transistor P60. Thus, the second power source voltage VSS is passed through the third node Q3 and transmitted to the eighth transistor P20 and the eleventh transistor P50. Accordingly, the eighth transistor P20 and the eleventh transistor P50 are turned on, and the first power source voltage VDD is passed through the eighth transistor P20 and transmitted to the output terminal of the second sequential driver 20_2, and the first power source voltage VDD is passed through the eleventh transistor P50 and transmitted to the seventh transistor P10.

Therefore, the second threshold voltage compensation signal Gv[2] output from the output terminal of the second sequential driver 20_2 is the first power source voltage VDD level, and the seventh transistor P10 is turned off by the first power source voltage VDD level. The second threshold voltage compensation signal Gv[2] output from the output terminal of the second sequential driver 20_2 is concurrently (for example, simultaneously) transmitted as the first input signal of the first sequential driver 20_3 (not shown) of the next sequential driver 20_3.

Next, at time B4, the first threshold voltage compensation signal Gv[1] is transmitted from the first sequential driver 20_1 as the second input signal, the second clock signal CLK2 is concurrently (for example, simultaneously) generated as a low-level pulse, and the second initialization signal INT2 is increased to the high level. Since at time B4, the first threshold voltage compensation signal Gv[1] is generated as the same pulse as the second clock signal CLK2 in the circuit of the first sequential driver 20_1, the second input signal is also transmitted as a low-level pulse.

Thus, the twelfth transistor P60 is turned off by the second initialization signal INT2 such that the eighth transistor P20 and the eleventh transistor P50 are no longer transmitted the second power source voltage VSS, and thereby the eighth transistor P20 and the eleventh transistor P50 are turned off. On the other hand, the ninth transistor P30 and the tenth transistor P40 are turned on. As a result, the first power source voltage VDD is passed through the ninth transistor P30 by the turn-on of the ninth transistor P30, and is passed through the third node Q3 and transmitted to the gate electrode of the eighth transistor P20, thereby turning off the eighth transistor P20.

Concurrently (for example, simultaneously), the voltage level of the second input signal is transmitted to the seventh transistor P10 by the turn-on of the tenth transistor P40, and the voltage level of the second input signal is the low level such that the seventh transistor P10 is turned on. Accordingly, the first clock signal CLK1 is passed through the seventh transistor P10, transmitted to the output terminal of the second sequential driver 20_2, and output as the second threshold voltage compensation signal Gv[2]. Thus, the second threshold voltage compensation signal Gv[2] is generated as the first clock signal CLK1 during one cycle of the second initialization signal INT2, that is, the period A1.

Next, the above process is repeated such that the second threshold voltage compensation signal Gv[2] is generated with the same pulse as the first clock signal CLK1 at the periods A2, A3, and A4 concurrently (for example, in synchronization) with the trailing edge of the second initialization signal INT2.

In FIG. 6 and FIG. 7, for better understanding and ease of description, only the first first sequential driver 20_1 and the first second sequential driver 20_2 are shown among the plurality of sequential drivers 20_1 to 20_*n* of the scan driver 20, along with the corresponding timing diagram for driving them. However, the other sequential drivers 20_3 to 20_*n* also have the same circuits as those of the first sequential driver 20_1 and the second sequential driver 20_2, and their waveform thereof is also repeated by the waveform of FIG. 7 (see, for example, the waveform for the third threshold voltage compensation signal Gv[3]).

Through the circuit of FIG. 6 and the driving timing diagram of FIG. 7, the scan driver 20 may generate the threshold voltage compensation signal Gv transmitted to each pixel for the plurality of pixel rows as a repeated pulse. That is, the number of pulses of the start signal FLM, the first clock signal CLK1, the second clock signal CLK2, and the period in which one pulse is generated are used to control the number of pulses included in the threshold voltage compensation signal Gv and the periods in which the pulses are generated such that the threshold voltage compensation period of the driving transistor Td may be increased in each pixel by the threshold voltage compensation signal Gv.

Figure 8:
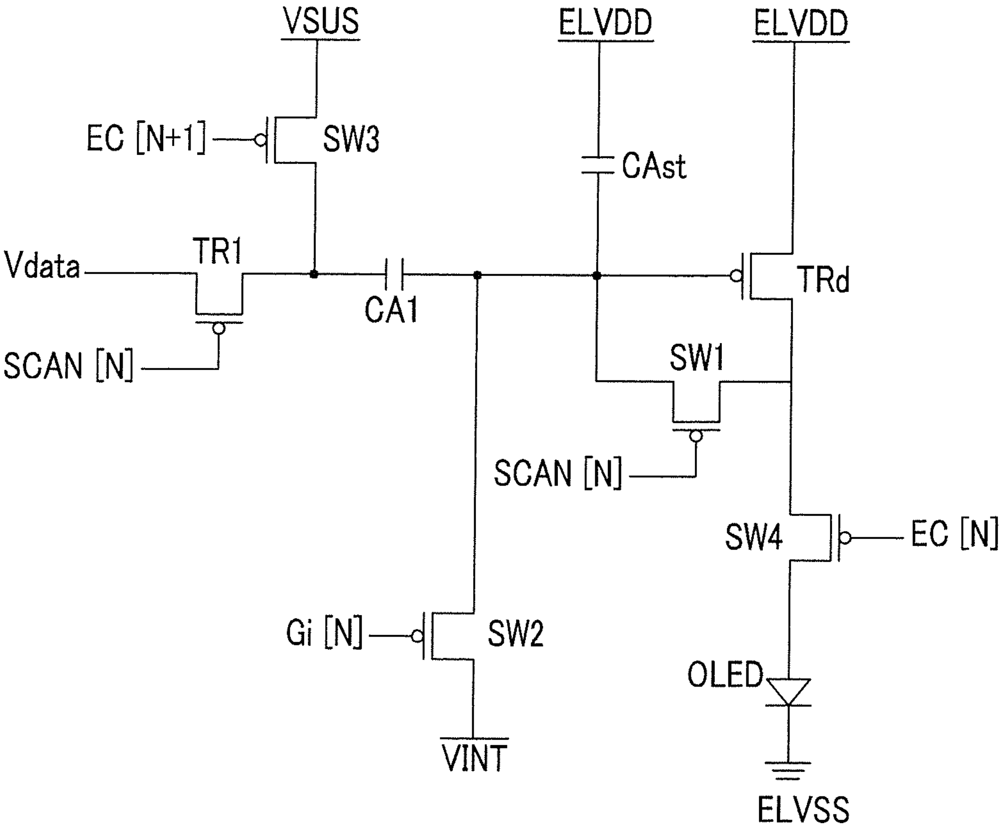
FIG. 8 is a circuit diagram showing a configuration of the pixel shown in FIG. 1 according to another exemplary embodiment.
Figure 9:
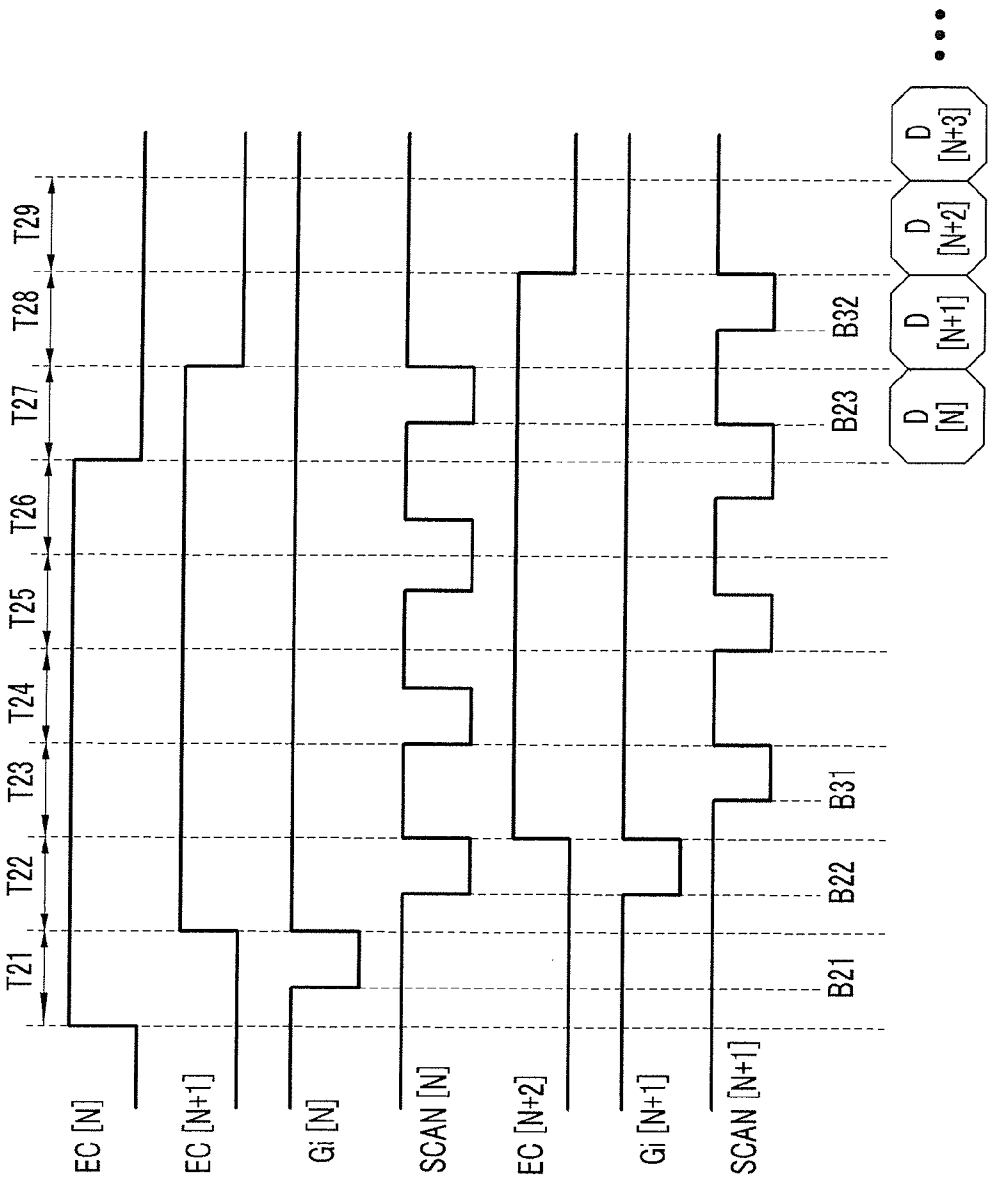
FIG. 9 is a driving timing diagram of the pixel shown in FIG. 8.

FIG. 8 is a circuit diagram showing a configuration of the pixel shown in FIG. 1 according to another exemplary embodiment, and FIG. 9 is a driving timing diagram of the pixel shown in FIG. 8.

Referring to FIG. 8, the pixel includes an OLED, a driving transistor TRd coupled to the anode of the OLED through a fourth switch S4, a first transistor TR1 coupled to a gate electrode of the driving transistor TRd through a first capacitor CA1, the first capacitor CA1 including a first electrode coupled to a drain electrode of the first transistor TR1 and a second electrode coupled to the gate electrode of the driving transistor TRd, a storage capacitor CAst coupled between the gate electrode of the driving transistor TRd and a first power source ELVDD, a first switch SW1 for diode-connecting the driving transistor TRd, a second switch SW2 for transmitting the initialization voltage VINT to the second electrode of the first capacitor CA1, and a third switch SW3 for transmitting an assistance voltage VSUS to the first electrode of the first capacitor CA1 and driving the fourth switch SW4 including a source electrode coupled to a drain electrode of the driving transistor TRd.

In the pixel of the exemplary embodiment of FIG. 8, the pixel is coupled to two scan lines Gi and SCAN for transmitting an initialization signal Gi[N] and a scan signal SCAN [N], respectively, and two light emission control lines EC for transmitting light emission control signals EC[N] and EC[N+1]. The scan signal SCAN[N] transmitted by the scan line SCAN is a signal for controlling the transmitting of a data signal to each pixel included in the Nth pixel row and concurrently (e.g., simultaneously) compensating a threshold voltage of the driving transistor TRd.

The OLED of the pixel of FIG. 8 includes the anode and a cathode, and emits light by a driving current according to the corresponding data signal. Here, the data signal is transmitted according to a pulse included in the scan signal SCAN[N] and the light is emitted by a voltage value corresponding to the data signal transmitted by a final pulse of the scan signal SCAN[N]. In addition, the scan signal SCAN[N] and the threshold voltage compensation signal are the same signal such that the threshold voltage compensation of the driving transistor TRd is also executed according to the pulses included in the scan signal SCAN[N] and the threshold voltage compensation is finished when the final pulse is transmitted.

The second switch SW2 is for transmitting the initialization voltage VINT. The second switch SW2 is turned on by the initialization signal Gi[N], at which point the initialization voltage VINT is transmitted to the second electrode of the first capacitor CA1.

Further, in FIG. 8, the light emission control signal EC[N+1] of a next pixel row is transmitted to the third switch SW3 for transmitting the assistance voltage VSUS during the initialization period. Accordingly, the assistance voltage VSUS is applied to the first electrode of the first capacitor CA1 during the initialization period such that floating of the first electrode of the first capacitor C1 is prevented.

The driving of the pixel according to the exemplary embodiment of FIG. 8 will be described with reference to the driving timing diagram of FIG. 9. First, the light emission control signal EC[N] is increased from the low level to the high level at the time that an initialization period T21 of FIG. 9 is started for the corresponding pixel of the plurality of pixels of the N-th pixel row such that the fourth switch SW4 is turned off, and thereby the light emitting of the OLED is blocked.

Then, at time B21, the initialization signal Gi[N] is decreased to the low level to turn on the second switch SW2, and the initialization voltage VINT is transmitted to the second electrode of the first capacitor CA1, such that the gate electrode of the driving transistor TRd is initialized by the initialization voltage VINT until the end of the initialization period T21. In addition, during the initialization period T21, the light emission control signal EC[N+1] of the (N+1)-th pixel row (that is, the next pixel row) is transmitted to the third switch SW3 as a low-level voltage. Consequently, the third switch SW3 transmits the assistance voltage VSUS to the first electrode of the first capacitor CA1 such that floating of the first electrode of the first capacitor CA1 is prevented during the initialization period of the assistance voltage VSUS.

The light emission control signal EC[N+1] and the initialization signal Gi[N] are increased to the high level at the time that a period T22 is started after the initialization period T21. The scan signal SCAN[N] is transmitted to the first transistor TR1 at the time B22 such that the corresponding data signal is transmitted to the gate electrode of the driving transistor TRd.

Here, the scan line SCAN for transmitting the scan signal SCAN[N] is coupled to a gate electrode of the first switch SW1, and the driving transistor TRd is diode-connected during the period in which the scan signal SCAN[N] is the low level during an interval B22-T27 such that the threshold voltage is compensated. Accordingly, the scan signal SCAN[N] is the threshold voltage compensation signal for the pixel circuit and the driving waveform thereof according to FIG. 8 and FIG. 9.

Referring to FIG. 9, the scan signal transmitted to the gate electrode of the first transistor TR1 and the threshold voltage compensation signal transmitted to the gate electrode of the first switch SW1 for diode-connecting the driving transistor TRd are the same signal, namely SCAN[N], such that the data signal is transmitted to the corresponding pixel according to the scan signal SCAN[N] during the period in which the threshold voltage of the driving transistor TRd is compensated.

According to an exemplary embodiment of the present invention, the threshold voltage compensation signal and the scan signal are the same signal SCAN[N] that includes four pulses. Four pulses are transmitted during the interval B22-T27 such that the pulses for the threshold voltage compensation are generated during a horizontal period of length more than that of 4 horizontal periods 4H, where horizontal period 1H is the length of each of the periods T21, T22, etc.

The interval B22-T27 is the interval in which the threshold voltage compensation signal SCAN[N] is transmitted to compensate the threshold voltage of the driving transistor TRd, and is also the interval in which the scan signal SCAN[N] is transmitted to the first transistor TR1 such that the corresponding data signal is transmitted through the first transistor TR1. However, the amount of light emitting of the OLED is controlled according to the voltage level of the data signal written to the final pulse of the scan signal SCAN[N]. That is, the gate electrode voltage of the driving transistor TRd is determined according to the voltage of the data signal transmitted to the first electrode of the first capacitor CA1 at the final pulse of the scan signal SCAN[N] transmitted at a time B23. The driving current is generated in the driving transistor TRd according to the determined gate voltage, and the OLED emits light corresponding to the driving current thereof.

That is, the light emission control signal EC[N] becomes the low level at the time in which the period T27 is started such that the fourth switch SW4 is turned on, and the data signal D[N] is transmitted through the first transistor TR1 and the first capacitor CA1 to the driving transistor TRd at the time B23. Thus, the gate electrode voltage of the driving transistor TRd is determined according to the data signal D[N], and the driving transistor TRd transmits the driving current corresponding to the data signal D[N] to the OLED. Accordingly, the OLED emits the light by the driving current according to the data signal D[N] written in the final pulse of the scan signal SCAN[N].

The driving of the plurality of pixels of the (N+1)-th pixel row as the next pixel row repeats the above-described process. That is, the period T22 is the initialization period in which during a sub-interval B22-T22, the initialization signal Gi[N+1] for controlling the transmitting of the initialization voltage VINT by the switching control of the second switch SW2 and the light emission control signal EC[N+2] for controlling the transmitting of the assistance voltage VSUS by the switching control of the third switch SW3 are concurrently (for example, simultaneously) the low level. The assistance voltage VSUS is transmitted to the first electrode of the first capacitor CA1 during the initialization period.

The threshold voltage compensation signal and the scan signal as the same signal SCAN[N+1] including four pulses are respectively transmitted to the first switch SW1 and the first transistor TR1 during the interval B31-T28. The threshold voltage compensation is executed according to the pulses included in the threshold voltage compensation signal, as described above, and the data signal D[N+1] for controlling the amount of light emitting of the OLED depends on the voltage level of the data signal D[N+1] written by a final pulse transmitted at a time B32.

Accordingly, the threshold voltage compensation period is increased by a period (for example, a predetermined period) such that sufficient compensation of the threshold voltage takes place and concurrently (for example, simultaneously) the data signal may be sequentially written. The light emitting period of the OLED of the (N+1)-th pixel is executed at the start of the period T28 in which the light emission control signal EC[N+1] is decreased to the low level.

The light emitting period of the pixel of the N-th line and the pixel of the (N+1)-th line starting at the periods T27 and T28, respectively, are the periods in which the light emission control signals are changed to the low level, however the present invention is not always limited thereto. Accordingly, in the period after the time that the transmission of the final pulse of the scan signal is completed, that is, the time that the period T27 is finished in the case of the pixel of the N-th line and the time that the period T28 is finished in the case of the pixel of the (N+1)-th line, the light emission control signal is decreased to the low level, thereby emitting the light.

Figure 10:
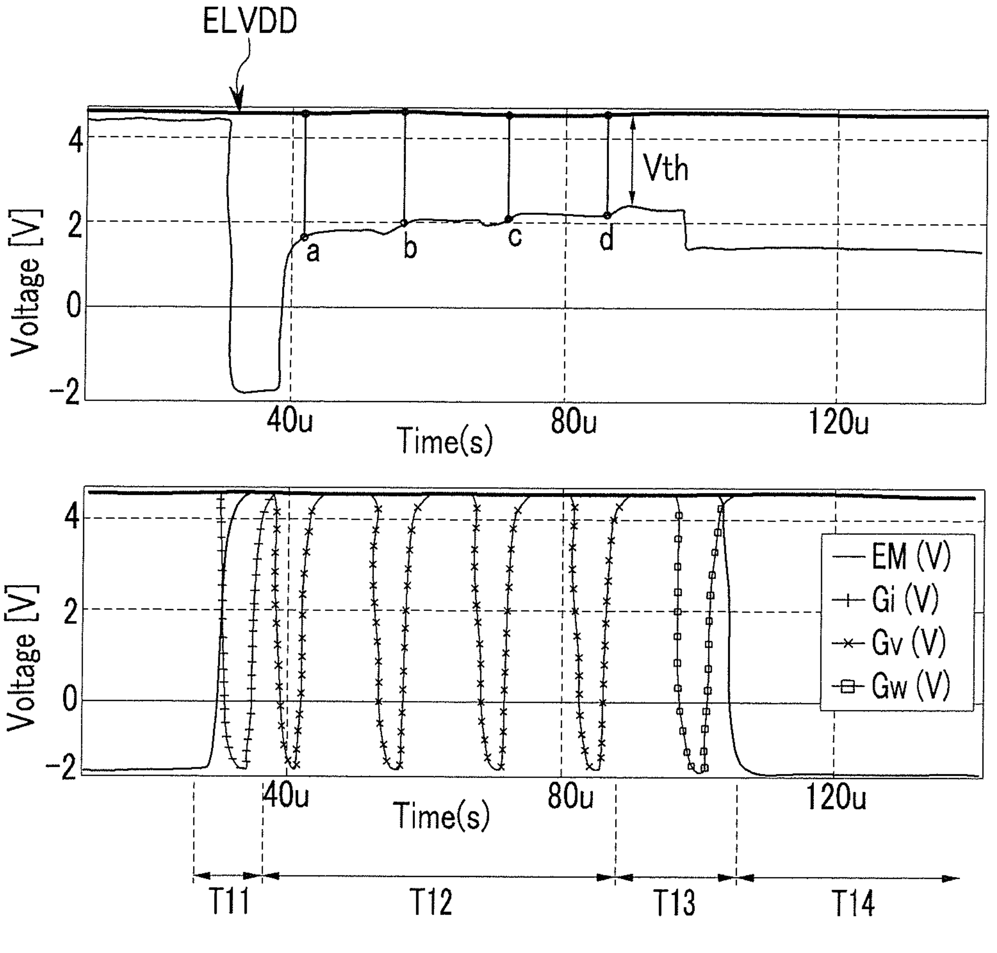
FIG. 10 is a graph showing a threshold voltage compensation capacity in a pixel driving of a display device according to an exemplary embodiment.

FIG. 10 is a graph showing a threshold voltage compensation capacity in pixel driving of a display device according to an exemplary embodiment of the present invention.

Referring to FIG. 10, the top graph illustrates a voltage change at the gate electrode of the driving transistor Td in the circuit diagram of FIG. 2, while the bottom graph illustrates the corresponding voltage values of light emission control signal EM, initialization signal Gi, threshold voltage compensation signal Gv, and scan signal Gw. As shown in the graph (before period T11), the voltage value of the gate electrode of the driving transistor Td is maintained as the voltage value corresponding to the data signal (for example, a predetermined data signal) in the directly previous frame, is decreased to the initialization voltage at the initialization period T11 in which the initialization signal Gi is transmitted, and is increased during the threshold voltage compensation period T12 in which the threshold voltage compensation signal Gv is transmitted. As illustrated in FIG. 10, it may be confirmed that the voltage value of the gate electrode is increased by the voltage value of the threshold voltage of the driving transistor Td subtracted from the voltage value of the first power source voltage ELVDD in the threshold voltage compensation period T12.

The threshold voltage compensation signal Gv according to an exemplary embodiment of the present invention includes at least two pulses such that the voltage value is gradually increased to be compensated by the voltage value of the threshold voltage of the driving transistor Td subtracted from the first power source voltage ELVDD voltage value every time that the pulse is applied. In the exemplary embodiment of FIG. 10, the threshold voltage compensation signal Gv includes four pulses such that it may be confirmed that the threshold voltage is compensated through four steps a→b→c→d. This means that the threshold voltage is completely compensated through the sufficient compensation time.

The OLED emits the light in the light emitting period T14 through the data input period T13 in which the voltage value corresponding to the data signal (for example, a predetermined data signal) of the current is applied after the threshold voltage compensation period T12.

Figure 11:
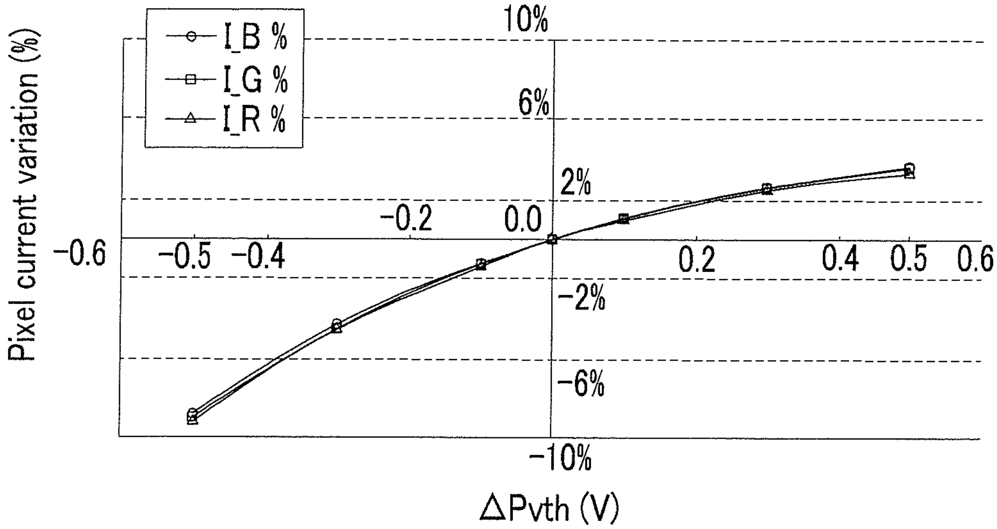
FIG. 11 is a graph showing a current variation of a pixel for a threshold voltage variation in pixel driving of a conventional display device.
Figure 12:
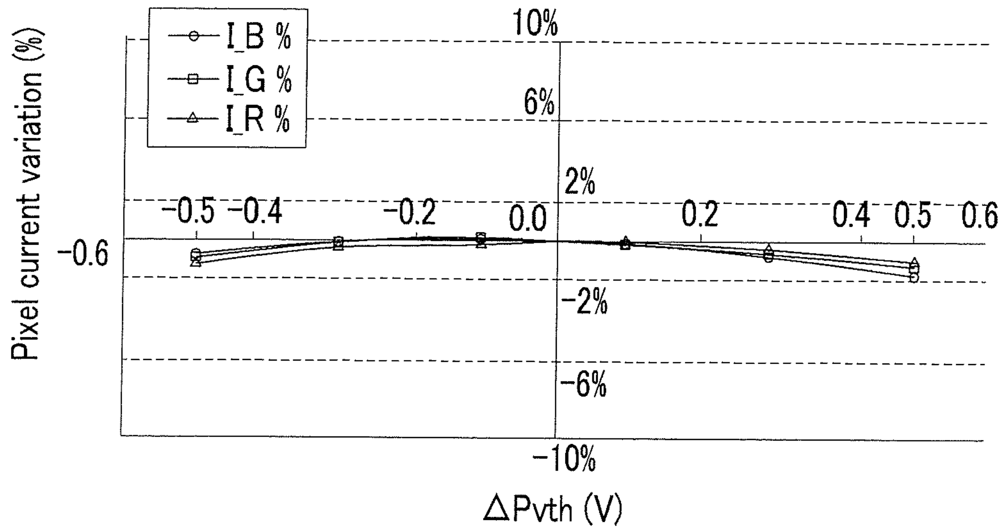
FIG. 12 is a graph showing a current variation of a pixel for a threshold voltage variation in pixel driving of a display device according to an exemplary embodiment of the present invention.

FIG. 11 is a graph showing a current variation of a pixel for a threshold voltage variation in pixel driving of a conventional display device, and FIG. 12 is a graph showing a current variation of a pixel for a threshold voltage variation in pixel driving of a display device according to an exemplary embodiment of the present invention. The compensation capability of the threshold voltage compensation under the pixel driving of the display device according to an exemplary embodiment of the present invention is clear through a comparison of FIG. 11 and FIG. 12.

FIG. 11 and FIG. 12 show the change of the currents I_B, I_G, and I_R of the pixels according to the change of threshold voltage Vth±0.5 V in the case of applying the pixel driving timing of the respective display device. Referring to FIG. 12, the change of the pixel current generates less than a maximum of ±2% for the change of the threshold voltage Vth of ±0.5 V. As shown in FIG. 11, the change of the pixel current is in the range of a maximum of ±9 to 10% for the change of the threshold voltage Vth of ±0.5 V in the pixel of the conventional OLED, display. Accordingly, it may be confirmed that the current change may be significantly reduced through embodiments of the present invention.

As described above, the display device and the driving method according to an exemplary embodiment of the present invention may significantly reduce the change of the driving current caused by the variation of the threshold voltage.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF REFERENCE NUMERALS

100: display device
10: display unit
20: scan driver
20_1: first first sequential driver
20_2: first second sequential driver
30: data driver
40: light emission control driver
50: signal controller
60: power supply unit

What is claimed is:

1. A display device comprising:

a display unit comprising a plurality of scan lines and a plurality of threshold voltage compensation lines for respectively transmitting a plurality of scan signals and a plurality of threshold voltage compensation signals, a plurality of data lines for transmitting a plurality of data signals, and a plurality of pixels coupled to a plurality of light emission control lines for transmitting a plurality of light emission control signals;

a scan driver for transmitting the plurality of scan signals and the plurality of threshold voltage compensation signals;

a data driver for transmitting the plurality of data signals; and a light emission control driver for transmitting the plurality of light emission control signals, wherein each pixel of the plurality of pixels comprises:

an organic light emitting diode (OLED);

a driving transistor for transmitting a driving current to the OLED according to one of the data signals;

a first transistor for transmitting the one of the data signals to the driving transistor according to one of the scan signals during a frame; and a first capacitor comprising a first terminal coupled to the first transistor and a second terminal coupled to a gate electrode of the driving transistor, wherein the driving transistor is further configured to be diode-connected according to one of the threshold voltage compensation signals during a threshold voltage compensation period to compensate for a threshold voltage of the driving transistor, and the one of the threshold voltage compensation signals comprises at least two pulses during the frame, and wherein the scan driver is further for:

receiving a start signal comprising a pulse pattern for generating the at least two pulses, a first clock signal, a second clock signal having a phase difference of a half cycle from the first clock signal, a first initialization signal generated concurrently with the second clock signal, and a second initialization signal generated concurrently with the first clock signal; and sequentially shifting the start signal by a first period to generate the plurality of threshold voltage compensation signals.

2. The display device of claim 1, wherein the pixel further comprises a first switch for diode-connecting the driving transistor according to the one of the threshold voltage compensation signals.

3. The display device of claim 1, wherein the gate electrode of the driving transistor is for receiving an initialization voltage during an initialization period for initializing a gate electrode voltage of the driving transistor, and the initialization period is before the threshold voltage compensation period.

4. The display device of claim 3, wherein the pixel further comprises:

a first switch for diode-connecting the driving transistor according to the one of the threshold voltage compensation signals;

a second switch for transmitting the initialization voltage to the gate electrode of the driving transistor during the initialization period; and a third switch for transmitting an assistance voltage to the first terminal of the first capacitor according to the one of the threshold voltage compensation signals.

5. The display device of claim 1, wherein the pixel further comprises a first switch for diode-connecting the driving transistor according to the one of the threshold voltage compensation signals, the one of the scan signals is the one of the threshold voltage compensation signals, and the OLED is for emitting light according to the one of the data signals when a final pulse of the at least two pulses is transmitted.

6. The display device of claim 5, wherein the plurality of pixels is arranged in a plurality of pixel rows and the pixel further comprises:

a second switch for transmitting an initialization voltage to the gate electrode of the driving transistor during an initialization period for initializing a gate electrode voltage of the driving transistor; and a third switch for transmitting an assistance voltage to the first terminal of the first capacitor according to one of the light emission control signals of a next one of the plurality of pixel rows during the initialization period.

7. The display device of claim 1, wherein the scan driver comprises:

a plurality of first sequential drivers for receiving a first input signal comprising the pulse pattern for generating the at least two pulses concurrently with the first clock signal, and outputting one of the second clock signal or a first power source voltage according to the first input signal and the first initialization signal as first threshold voltage compensation signals of the threshold voltage compensation signals; and a plurality of second sequential drivers for receiving a second input signal comprising the pulse pattern for generating the at least two pulses concurrently with the second clock signal, and outputting one of the first clock signal or the first power source voltage according to the second input signal and the second initialization signal as second threshold voltage compensation signals of the threshold voltage compensation signals.

8. The display device of claim 7, wherein each first sequential driver of the plurality of first sequential drivers is for receiving the start signal or one of the second threshold voltage compensation signals of one of the second sequential drivers that is earlier than and adjacent to the first sequential driver as the first input signal.

9. The display device of claim 8, wherein the first sequential driver comprises:

a fourth switch for transmitting the first power source voltage to one of the threshold voltage compensation lines and another of the second sequential drivers that is adjacent to and later than the first sequential driver in response to the first initialization signal; and a fifth switch for transmitting the second clock signal to the one of the threshold voltage compensation lines and the other of the second sequential drivers in response to the first input signal.

10. The display device of claim 9, wherein the first sequential driver further comprises:

a sixth switch for transmitting the first input signal to the fifth switch according to the first clock signal; and a seventh switch for transmitting the first power source voltage to the fourth switch according to the first input signal, wherein the seventh switch is further for turning on when the first input signal is a first level, and the fourth switch is further for turning off according to the first power source voltage.

11. The display device of claim 10, wherein the first sequential driver further comprises an eighth switch for transmitting a second power source voltage to the fourth switch according to the first initialization signal, and the fourth switch is further for turning on according to the second power source voltage.

12. The display device of claim 11, wherein the first sequential driver further comprises a ninth switch for transmitting the first power source voltage to a drain electrode of the sixth switch according to the second power source voltage.

13. The display device of claim 12, wherein the ninth switch comprises at least two transistors that are coupled in series, and the at least two transistors are for turning on according to the second power source voltage.

14. The display device of claim 9, wherein the first sequential driver further comprises:

a first capacitor comprising one terminal coupled to a first node for transmitting a voltage for controlling a switching operation of the fourth switch and another terminal coupled to the first power source; and a second capacitor comprising one terminal coupled to a second node for transmitting a voltage for controlling a switching operation of the fifth switch and another terminal coupled to an output terminal of the first sequential driver.

15. The display device of claim 14, wherein the fourth switch comprises a first electrode coupled to the first power source and a second electrode coupled to the output terminal, and the fifth switch comprises a first electrode coupled to the output terminal and a second electrode for receiving the second clock signal.

16. The display device of claim 7, wherein each second sequential driver of the plurality of second sequential drivers is for receiving one of the first threshold voltage compensation signals of one of the first sequential drivers that is earlier than and adjacent to the second sequential driver as the second input signal.

17. The display device of claim 16, wherein the second sequential driver comprises:

a tenth switch for transmitting the first power source voltage to one of the threshold voltage compensation lines and another of the first sequential drivers that is adjacent to and later than the second sequential driver in response to the second initialization signal; and an eleventh switch for transmitting the first clock signal to the one of the threshold voltage compensation lines and the other of the first sequential drivers in response to the second input signal.

18. The display device of claim 17, wherein the second sequential driver further comprises:

a twelfth switch for transmitting the second input signal to the eleventh switch according to the second clock signal; and a thirteenth switch for transmitting the first power source voltage to the tenth switch according to the second input signal, wherein the thirteenth switch is further for turning on when the second input signal is a first level, and the tenth switch is further for turning off according to the first power source voltage.

19. The display device of claim 18, wherein the second sequential driver further comprises a fourteenth switch for transmitting a second power source voltage to the tenth switch according to the second initialization signal, and the tenth switch is further for turning on according to the second power source voltage.

20. The display device of claim 19, wherein the second sequential driver further comprises a fifteenth switch for transmitting the first power source voltage to a drain electrode of the twelfth switch according to the second power source voltage.

21. The display device of claim 20, wherein the fifteenth switch comprises at least two transistors that are coupled in series, and the at least two transistors are for turning on according to the second power source voltage.

22. The display device of claim 17, wherein the second sequential driver further comprises:

a third capacitor comprising one terminal coupled to a third node for transmitting a voltage for controlling a switching operation of the tenth switch and another terminal coupled to the first power source; and a fourth capacitor comprising one terminal coupled to a fourth node for transmitting a voltage for controlling a switching operation of the eleventh switch and another terminal coupled to an output terminal of the second sequential driver.

23. The display device of claim 22, wherein the tenth switch comprises a first electrode coupled to the first power source and a second electrode coupled to the output terminal, and the eleventh switch comprises a first electrode coupled to the output terminal and a second electrode for receiving the first clock signal.

24. The display device of claim 1, wherein the plurality of scan lines further comprises a plurality of second scan lines for transmitting an initialization signal to the plurality of pixels, the pixel further comprises a second switch for transmitting an initialization voltage to the second terminal of the first capacitor, and the scan driver is further for generating the initialization signal for controlling a switching operation of the second switch, and for transmitting the initialization signal to the plurality of second scan lines.

25. The display device of claim 1, wherein the pixel further comprises a second switch for transmitting an initialization voltage to the second terminal of the first capacitor according to an initialization signal, and the initialization signal is another one of the scan signals transmitted at an earlier time corresponding to the at least two pulses than a time of the one of the scan signals.

26. The display device of claim 1, wherein a period of one of the at least two pulses is more than one horizontal period.

27. A method for driving a display device in frames, the display device comprising a plurality of pixels and a scan driver for transmitting a plurality of scan signals and a plurality of threshold voltage compensation signals to the plurality of pixels during each of the frames, each of the threshold voltage compensation signals comprising at least two pulses during each of the frames, wherein each of the plurality of pixels comprises an organic light emitting diode (OLED), a driving transistor for controlling a current supplied to the OLED, a first transistor for transmitting a data signal to the driving transistor, and a first capacitor coupled between the driving transistor and the first transistor, the method comprising:

initializing a gate voltage of the driving transistor;

compensating a threshold voltage of the driving transistor; and transmitting the data signal to the driving transistor through the first capacitor during one of the frames, wherein the compensating of the threshold voltage comprises diode-connecting the driving transistor according to one of the threshold voltage compensation signals during a threshold voltage compensation period comprising the at least two pulses of the one of the threshold voltage compensation signals during the one of the frames, and wherein the scan driver is further for generating the one of the threshold voltage compensation signals by:

receiving a start signal comprising a pulse pattern for generating the at least two pulses, a first clock signal, a second clock signal having a phase difference of a half cycle from the first clock signal, a first initialization signal generated concurrently with the second clock signal, and a second initialization signal generated concurrently with the first clock signal; and sequentially shifting the start signal by a first period.

28. The method of claim 27, wherein the initializing of the gate voltage comprises applying an initialization voltage to a second terminal of the first capacitor coupled to a gate electrode of the driving transistor.

29. The method of claim 27, wherein the compensating of the threshold voltage further comprises:

applying an assistance voltage to a first terminal of the first capacitor coupled to the first transistor; and charging a voltage corresponding to the threshold voltage of the driving transistor to a storage capacitor coupled between a gate electrode of the driving transistor and a first power source.

30. The method of claim 27, wherein the transmitting of the data signal comprises transmitting the data signal during the threshold voltage compensation period, and the method further comprises:

transmitting one of the scan signals to the first transistor, the one of the scan signals being the one of the threshold voltage compensation signals; and emitting light by the OLED according to the data signal when a final of the at least two pulses is transmitted.

31. The method of claim 27, wherein the scan driver is further for generating the plurality of threshold voltage compensation signals by:

receiving a first input signal comprising the pulse pattern for generating the at least two pulses concurrently with the first clock signal;

outputting one of the second clock signal or a first power source voltage according to the first input signal and the first initialization signal as a plurality of first threshold voltage compensation signals of the threshold voltage compensation signals;

receiving a second input signal comprising the pulse pattern for generating the at least two pulses concurrently with the second clock signal; and outputting one of the first clock signal or the first power source voltage according to the second input signal and the second initialization signal as a plurality of second threshold voltage compensation signals of the threshold voltage compensation signals.

32. The method of claim 31, wherein the scan driver comprises a plurality of sequential drivers for transmitting the threshold voltage compensation signals, and the first input signal is the start signal or one of the second threshold voltage compensation signals of one of the sequential drivers directly before another of the sequential drivers and for transmitting the first input signal.

33. The method of claim 31, wherein the scan driver comprises a plurality of sequential drivers for transmitting the threshold voltage compensation signals, and the second input signal is one of the first threshold voltage compensation signals of one of the sequential drivers directly before another of the sequential drivers and for transmitting the second input signal.

34. The method of claim 27, wherein a period of one of the at least two pulses is more than one horizontal period.

* * * * *